United States Patent
Gaither et al.

(10) Patent No.: US 11,446,996 B2
(45) Date of Patent: Sep. 20, 2022

(54) SELECTIVELY MOVABLE ELECTRIC PROPULSION MOTOR AND METHOD FOR POSITIONING THE SAME

(71) Applicant: Toyota Motor Engineering & Manufacturing North America, Inc., Plano, TX (US)

(72) Inventors: Geoffrey David Gaither, Brighton, MI (US); Robert C. MacArthur, Ypsilanti, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 353 days.

(21) Appl. No.: 16/672,773

(22) Filed: Nov. 4, 2019

(65) Prior Publication Data
US 2021/0129650 A1 May 6, 2021

(51) Int. Cl.
*B60K 1/02* (2006.01)
*B60W 30/20* (2006.01)
(Continued)

(52) U.S. Cl.
CPC .............. *B60K 1/02* (2013.01); *B60G 17/015* (2013.01); *B60W 20/17* (2016.01); *B60W 30/20* (2013.01);
(Continued)

(58) Field of Classification Search
CPC .......... B60K 1/02; B60K 6/26; B60K 7/0007; B60K 2001/001; B60K 1/00; B60G 17/015; B60G 2500/30; B60G 2202/40; B60G 2202/42; B60G 2300/50; B60G 2400/0513; B60G 2400/204; B60G 2400/208; B60G 2400/252; B60G 2400/34; B60G 2400/38; B60G 2400/39; B60G 2400/71; B60G 2400/732; B60G 2400/82; B60G 2400/843; B60G 2401/142; B60G 2401/174; B60G 2600/44; B60G 2800/016; B60G 2800/912; B60G 2800/914; B60G 2800/916; B60W 20/17; B60W 30/20; B60W 2510/0676;
(Continued)

(56) References Cited

U.S. PATENT DOCUMENTS 5,165,838 A * 11/1992 Kallansrude ....... B60G 17/0152
198/782
6,276,474 B1 8/2001 Ruppert et al.
(Continued)

*Primary Examiner* — Sze-Hon Kong
(74) *Attorney, Agent, or Firm* — Christopher G. Darrow; Darrow Mustafa PC

(57) ABSTRACT

A powertrain for a vehicle may include a vehicle chassis, a rotatable vehicle drive axle, at least one selectively movable electric propulsion motor having a rotatable motor shaft rotatable about an axis defined by the rotatable vehicle drive axle, a motor actuator connected to the at least one selectively movable electric propulsion motor, and a control system in communication with the motor actuator. The control system may include a memory device in communication with the control system having instructions that when executed by the control system causes the control system to receive at least one input from at least one sensor and instruct the motor actuator to rotate the at least one selectively movable electric propulsion motor based on the at least one input from the sensor.

19 Claims, 13 Drawing Sheets

(51) Int. Cl.
  *B60G 17/015* (2006.01)
  *B60W 20/17* (2016.01)
  *B60K 6/26* (2007.10)
  *B60K 7/00* (2006.01)

(52) U.S. Cl.
  CPC ............ *B60G 2500/30* (2013.01); *B60K 6/26* (2013.01); *B60K 7/0007* (2013.01); *B60W 2510/0676* (2013.01); *B60W 2510/087* (2013.01); *B60W 2510/107* (2013.01); *B60W 2510/244* (2013.01); *B60W 2510/246* (2013.01); *B60W 2520/06* (2013.01); *B60W 2520/10* (2013.01); *B60W 2520/105* (2013.01); *B60W 2520/14* (2013.01); *B60W 2520/26* (2013.01); *B60Y 2200/91* (2013.01); *B60Y 2200/92* (2013.01)

(58) Field of Classification Search
  CPC ..... B60W 2510/087; B60W 2510/107; B60W 2510/244; B60W 2510/246; B60W 2520/06; B60W 2520/10; B60W 2520/105; B60W 2520/14; B60W 2520/26; B60Y 2200/91; B60Y 2200/92
  See application file for complete search history.

(56) References Cited

U.S. PATENT DOCUMENTS

| | | |
|---|---|---|
| 7,597,164 B2 | 10/2009 | Severinsky et al. |
| 8,151,919 B2 | 4/2012 | Chen et al. |
| 8,167,752 B2 | 5/2012 | Houle |
| 11,292,325 B2* | 4/2022 | Meyer ................ B60K 7/0007 |
| 2006/0012144 A1* | 1/2006 | Kunzler ............ B60G 17/0195 |
| | | 280/124.125 |
| 2010/0025131 A1 | 2/2010 | Gloceri et al. |
| 2010/0155168 A1* | 6/2010 | Mies .................. B60K 7/0007 |
| | | 180/300 |
| 2011/0237387 A1* | 9/2011 | Yang .................. B60W 10/107 |
| | | 477/5 |
| 2012/0072076 A1* | 3/2012 | Gustavsson ........... B60W 10/08 |
| | | 701/41 |
| 2012/0183383 A1* | 7/2012 | Stolkin ................ B62D 55/075 |
| | | 414/729 |
| 2015/0096823 A1* | 4/2015 | Raymond ................ B60K 1/02 |
| | | 180/252 |
| 2016/0075397 A1* | 3/2016 | Juan ........................ B60G 3/20 |
| | | 280/275 |
| 2016/0200160 A1* | 7/2016 | Yi ..................... B60G 17/0164 |
| | | 701/37 |
| 2018/0244169 A1* | 8/2018 | Meyer .................... B60L 58/12 |
| 2019/0263213 A1* | 8/2019 | Sakka ..................... B60G 3/06 |
| 2019/0375287 A1* | 12/2019 | Verbridge ............ B60K 7/0007 |
| 2020/0010131 A1* | 1/2020 | Zona .................... B62D 55/065 |
| 2020/0023916 A1* | 1/2020 | Mackarvich ............ B62D 61/12 |
| 2021/0094534 A1* | 4/2021 | Hyun ................. B60G 17/0165 |
| 2021/0221446 A1* | 7/2021 | Kristofek ............... B62D 31/00 |
| 2021/0260946 A1* | 8/2021 | Tighare ..................... B60G 3/14 |
| 2021/0268885 A1* | 9/2021 | Terrat .................... F16H 57/033 |
| 2021/0316605 A1* | 10/2021 | Yukishima ............... H02K 7/14 |
| 2022/0041203 A1* | 2/2022 | Tighare ............... B62D 49/0678 |
| 2022/0072951 A1* | 3/2022 | Auer .................... B60K 7/0007 |
| 2022/0126643 A1* | 4/2022 | Nemeth ............... B60K 7/0007 |

\* cited by examiner

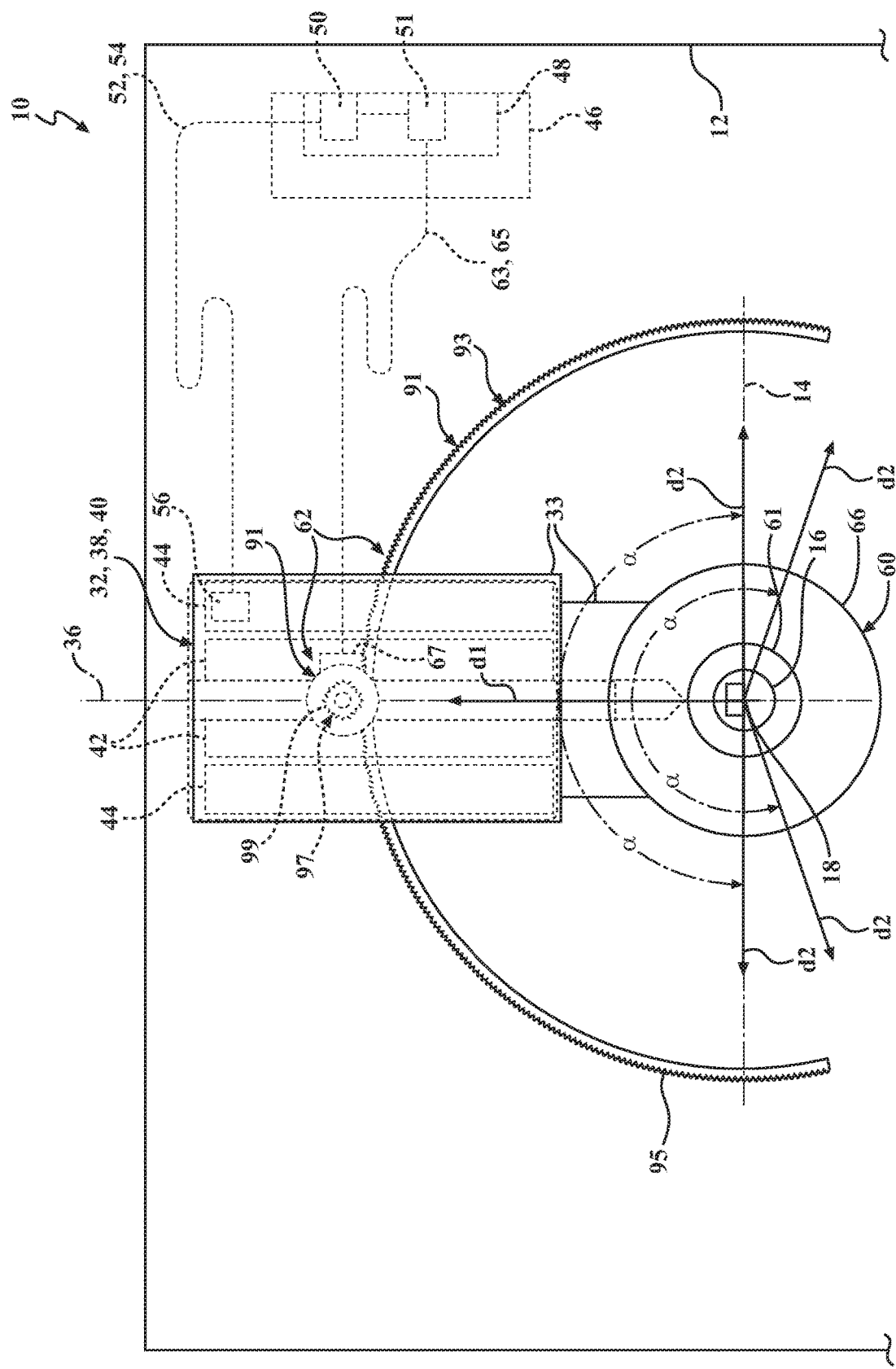

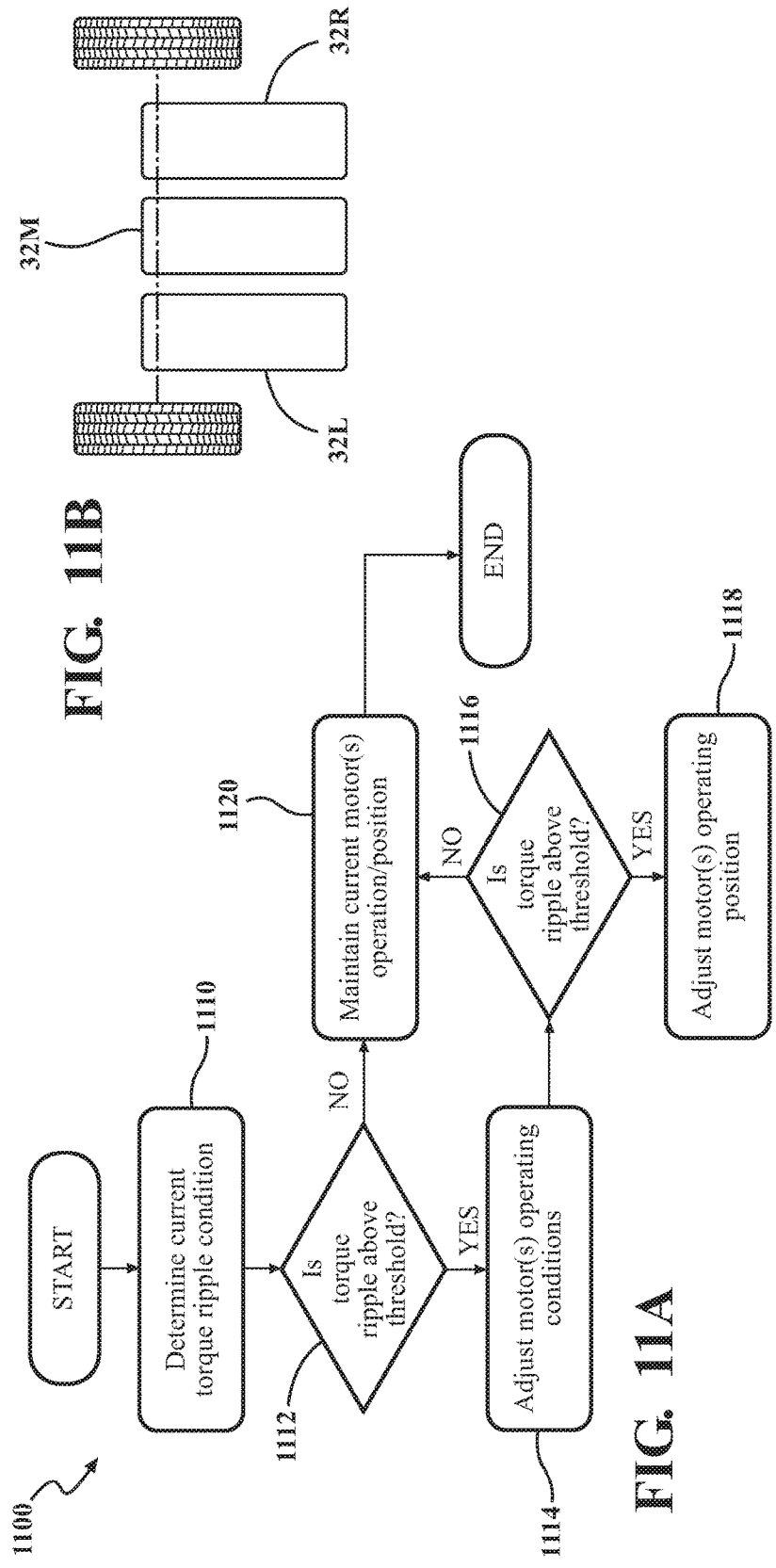
FIG. 11B
FIG. 11A
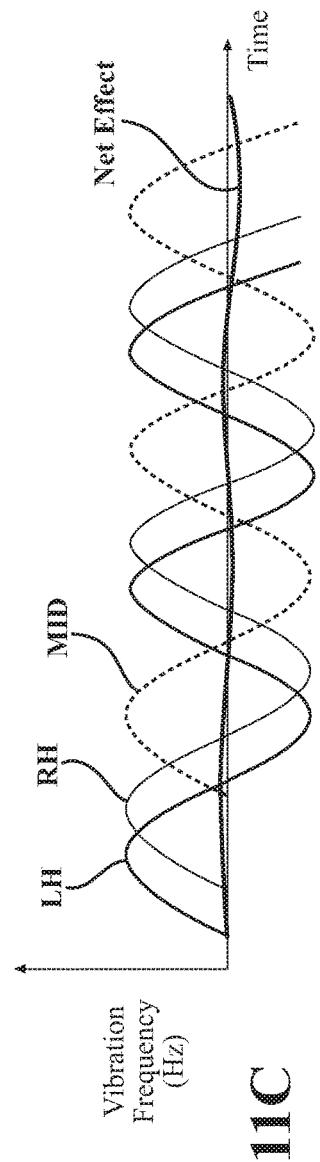
FIG. 11C

SELECTIVELY MOVABLE ELECTRIC PROPULSION MOTOR AND METHOD FOR POSITIONING THE SAME

TECHNICAL FIELD

The subject matter described herein relates, in general, to electric propulsion motors and, more particularly, to electric propulsion motors for vehicles.

BACKGROUND

The background description provided is to present the context of the disclosure generally. Work of the inventor(s), to the extent it may be described in this background section, and aspects of the description that may not otherwise qualify as prior art at the time of filing, are neither expressly nor impliedly admitted as prior art against the present technology.

Vehicles that utilize electrical propulsion systems, such as battery electric vehicles (BEV), plug-in hybrid electric vehicles (PHEV), hybrid electric vehicles (HEV), and the like, may have some advantages over there non-electrical vehicle counterparts, such as reduced consumption of hydrocarbon-based fuels, improved performance due to the high torque output of the electrical propulsion systems, and other advantages.

Current designs of vehicles that utilize electrical propulsion systems position the electric propulsion motors in the same horizontal plane as the drive wheels in nearly all applications. The electric propulsion motors are mounted in fixed positions in the vehicle with the motor axis oriented longitudinally or transversely in the vehicle in a horizontal plane defined by the vehicle drive wheels.

The current positioning of the electric propulsion motors may not be ideal and may negatively impact the cooling performance of the vehicle, the ground clearance of the vehicle, the aerodynamics of the vehicle, the noise, vibration, and harshness (NVH) experienced by the occupants of the vehicle, and the like.

SUMMARY

This section generally summarizes the disclosure and is not a comprehensive explanation of its full scope or all its features.

In one embodiment, a powertrain for a vehicle may include a vehicle chassis, a rotatable vehicle drive axle, at least one selectively movable electric propulsion motor having a rotatable motor shaft rotatable about an axis defined by the rotatable vehicle drive axle, a motor actuator connected to the at least one selectively movable electric propulsion motor, and a control system in communication with the motor actuator. The control system may include a memory device in communication with the control system having instructions that when executed by the control system causes the control system to receive at least one input from at least one sensor and instruct the motor actuator to rotate the at least one selectively movable electric propulsion motor based on the at least one input from the sensor.

In another embodiment, a method for positioning at least one selectively movable electric propulsion motor operatively coupled to a rotatable vehicle drive axle and rotatable about an axis defined by the rotatable vehicle drive axle includes the steps of receiving at least one input from at least one sensor and rotating the at least one selectively movable electric propulsion motor based on the at least one input.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 2A-2C illustrate different implementations of the selectively movable electric propulsion motor of FIG. 1;

FIGS. 11A-11C illustrates a method for reducing torque ripple of a vehicle by changing the position of three movable electric propulsion motors.

DETAILED DESCRIPTION

Figure 1:
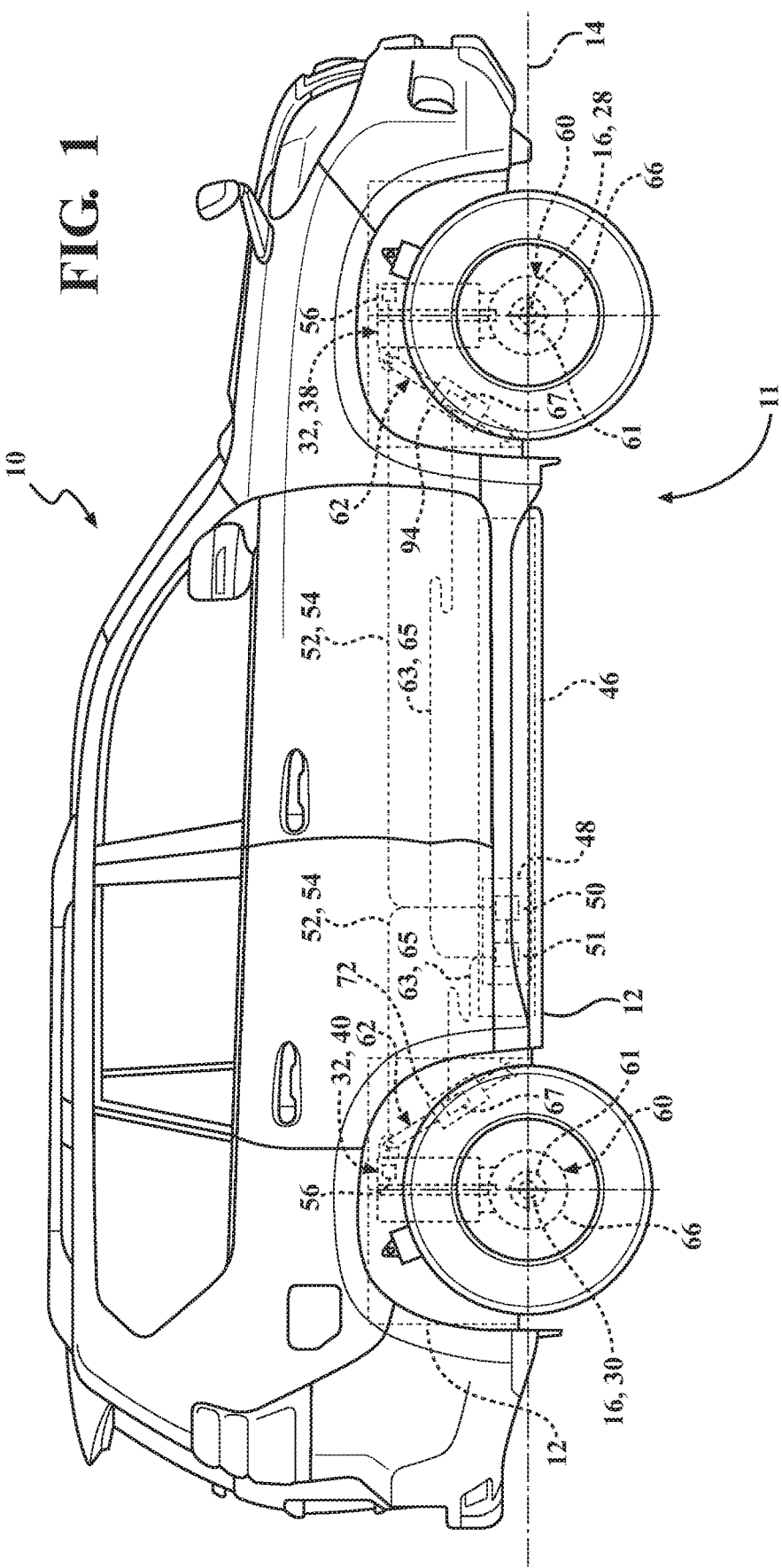
FIG. 1 illustrates a vehicle having a selectively movable electric propulsion motor.

A powertrain for a vehicle may include a selectively movable electric propulsion motor that has a rotatable motor shaft that acts as an output shaft. The output shaft is in mechanical communication with a vehicle drive axle such that when the rotatable motor shaft rotates, power will be delivered to the vehicle drive axle from the selectively movable electric propulsion motor.

An actuator is mechanically coupled to the selectively movable electric propulsion motor. The actuator can rotate the position of the selectively movable electric propulsion motor based on commands from a control system. The control system may receive information from the sensor and, based on this information from the sensor, rotate the selectively movable electric propulsion motor to improve one or more performance factors of the vehicle. These performance factors could include improving cooling, aerodynamics, NVH, ground clearance, among other factors.

In one embodiment, as illustrated in FIGS. 1 and 2A-2C, a vehicle 10 having a powertrain 11 that includes a selectively movable electric propulsion motor 38 and/or rear selectively movable electric propulsion motor 40 may each comprise a stator 42 that has an axially-extending cylindrical shape and may be configured to be fixed and stationary and a selectively reversibly rotatable rotor 44 that may be configured for selectively reversible rotation and is disposed radially inwardly of and concentric with the stator 42 and that also has an axially-extending cylindrical shape.

The electric vehicle 10 comprises a vehicle chassis 12 extending along a longitudinal axis 14 of the electric vehicle and a rotatable vehicle drive axle 16 disposed along a transverse axis 18 or axle axis that has opposed axle ends 20, 22 that are configured for attachment of a pair of opposed drive wheels 24, 26. As used herein, the vehicle chassis 12 may comprise any fixed portion of the electric vehicle 10 and may comprise the vehicle frame or body, particularly in vehicles that employ unibody construction, or a combination thereof. The selectively movable electric propulsion motor 32 may be used on the electric vehicle 10 in conjunction with a rotatable vehicle drive axle 16 in any desired manner or location, including as a front rotatable vehicle drive axle 28 (e.g. in a front-wheel drive (FWD) vehicle) with opposed front drive wheels, a rear rotatable vehicle drive axle 30 (e.g. in a rear-wheel-drive (RWD) vehicle) with opposed read drive wheels, or as a front rotatable vehicle drive axle with opposed front-drive wheels and rear rotatable vehicle drive axle with opposed rear drive wheels (e.g. in an all-wheel-drive (AWD) or four-wheel drive (4WD) vehicle).

The vehicle 10 may be battery electric vehicles (BEV), plug-in hybrid electric vehicles (PHEV), hybrid electric vehicles (HEV) or any type of vehicle that utilizes, at least in part, an electric propulsion system. Further, it should be understood that the vehicle 10 could take any one of a number of different forms. For example, the vehicle 10 may be any one of a number of different types of vehicles capable of transporting persons or items from one location to another. In the example shown in FIG. 1, the vehicle 10 is in the form of a sport utility vehicle (SUV). However, the vehicle 10 may take any one of a number of different forms, such as a sedan, truck, heavy-duty truck, tractor-trailer, tractor, mining vehicle, military vehicle, and the like. In addition, the vehicle 10 may not be limited to ground-based vehicles but could also include aircraft and seagoing vessels as well.

The selectively movable electric propulsion motor 32 may comprise a rotatable motor shaft 34 that is reversibly rotatable in either direction about a motor axis 36. The selectively movable electric propulsion motor 32 may comprise any suitable number or type of electric propulsion motor. In one embodiment, the selectively movable electric propulsion motor 32 comprises a pair of selectively movable electric propulsion motors, a front selectively movable electric propulsion motor 38 and a rear selectively movable electric propulsion motor 40. The front selectively movable electric propulsion motor 38 and rear selectively movable electric propulsion motor 40 may be identical to one another and may comprise the same motor type, as described herein, and/or utilize the same motor construction (e.g. stator and rotor configuration), and/or may have the same motive power output (e.g. torque output). Alternately, the front selectively movable electric propulsion motor 38 and rear selectively movable electric propulsion motor 40 may be different from one another and may comprise different motor types, as described herein, and/or utilize different motor constructions (e.g. stator and rotor configurations), and/or may have different motive power outputs (e.g. torque outputs).

The selectively movable electric propulsion motor 32 may comprise any suitable type of electric motor comprising a fixed stator 42 and a selectively reversibly rotatable rotor 44 disposed within the stator, including various alternating current (AC) and direct current (DC) powered electric motors, including both brushed (BDC) and brushless (BLDC) electric propulsion motors. In one embodiment, the selectively movable electric propulsion motor 32 comprises an AC electric propulsion motor and conventional power electronics including a current inverter and a voltage converter. The DC power and current from the vehicle battery 46 is converted to AC power and current using the power inverter and the voltage from the vehicle battery is stepped up to a high voltage (e.g. about 210 VDC to about 650 VAC) using the voltage converter.

The selectively movable electric propulsion motor 32 is configured to be mounted within the vehicle chassis 12 and operatively coupled to the rotatable vehicle drive axle 16 and opposed drive wheels 24, 26 as described herein. In one embodiment, the rotatable vehicle drive axle 16 and opposed drive wheels 24, 26 may comprise a rotatable vehicle drive axle 16, which may include rotatable vehicle drive axle half shafts or axle portions extending from a selectively movable differential 60 and operatively coupled to the opposed drive wheels 24, 26 in a conventional manner, including the use of axle housings 61, axle bearings, wheel bearings, wheel hubs, and the like, as well as operative coupling to brake systems and components, steering systems and components, and suspension systems and components as are known in the art.

The selectively movable electric propulsion motor 32 and motor axis 36 are configured to be oriented in a substantially vertical direction and movable with reference to the rotatable vehicle drive axle 16. As used herein, substantially vertical means that the selectively movable electric propulsion motor 32 and motor axis 36 are configured to be mounted in, and/or may be selectively moved into, a position where they are nearly vertical, for example, within 0-15°, more particularly 0-10°, and more particularly 0-5° of a vertical orientation, and including a vertical orientation.

As used herein, selectively movable means movable by an electrically powered motor actuator 62 by any suitable electrical power and/or signal communication device 63, such as an actuator power bus 65 that comprises an electrical conductor configured to electrically communicate voltage and current from the vehicle battery 46, which may be electrically connected to the electrically powered motor actuator by any suitable electrical power attachment, including an electrical connector 67, for example. The electrically powered motor actuator 62 may be actuated to selectively move and change the position of the selectively movable electric propulsion motor 32 and motor axis 36 in any suitable manner, including manually or automatically.

Figure 2A:
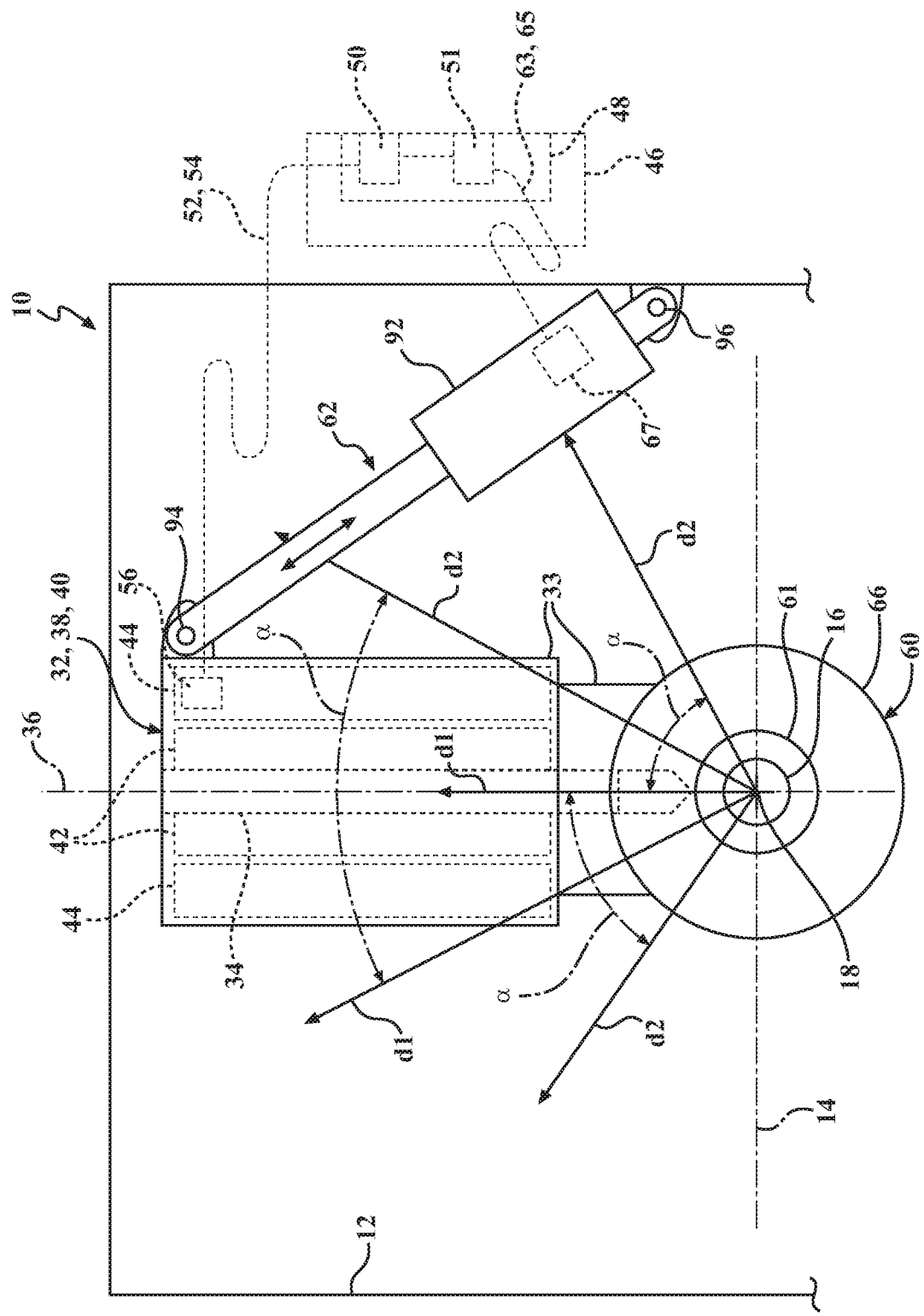
Figure 2B:
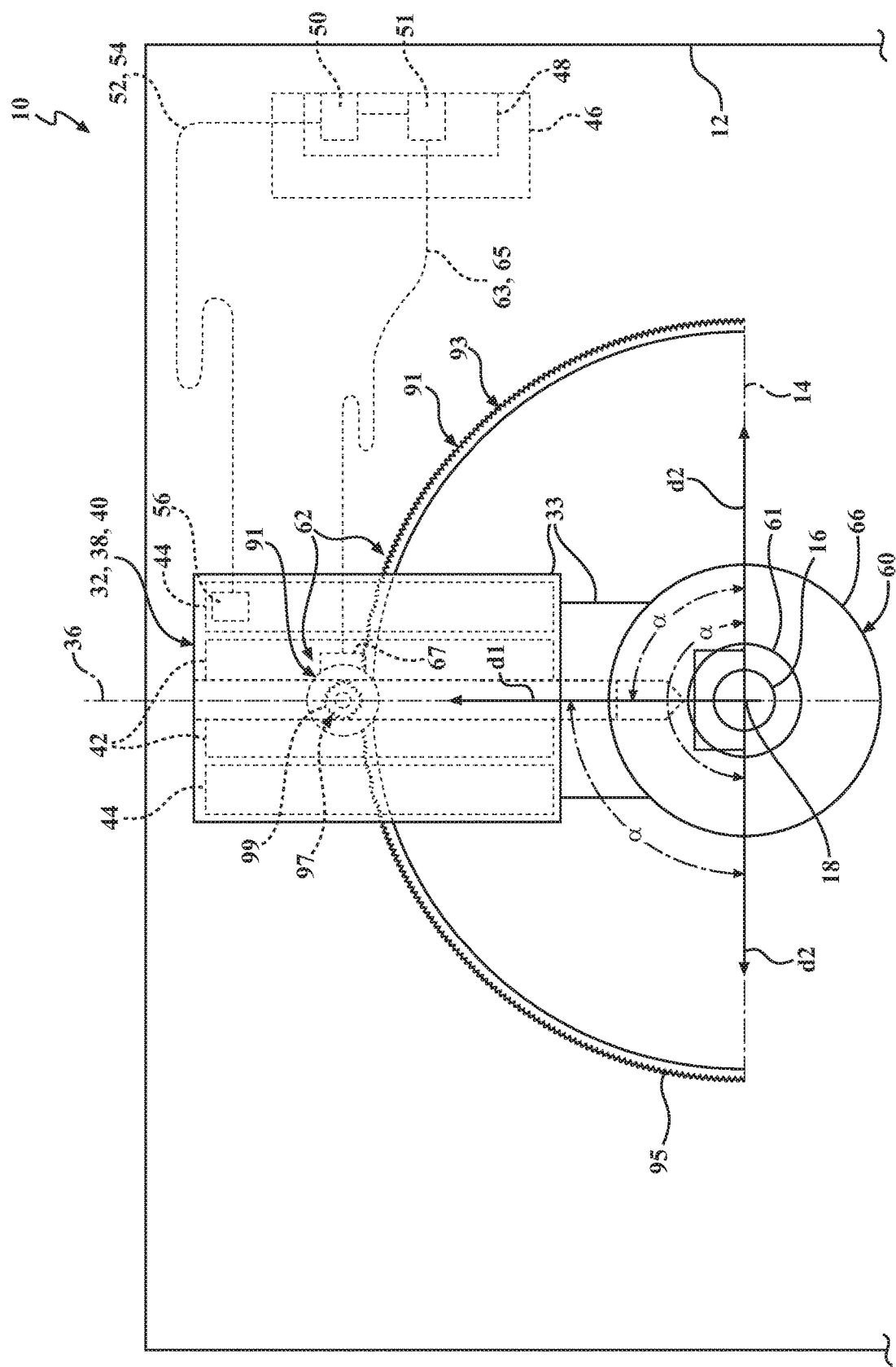
Figure 3:
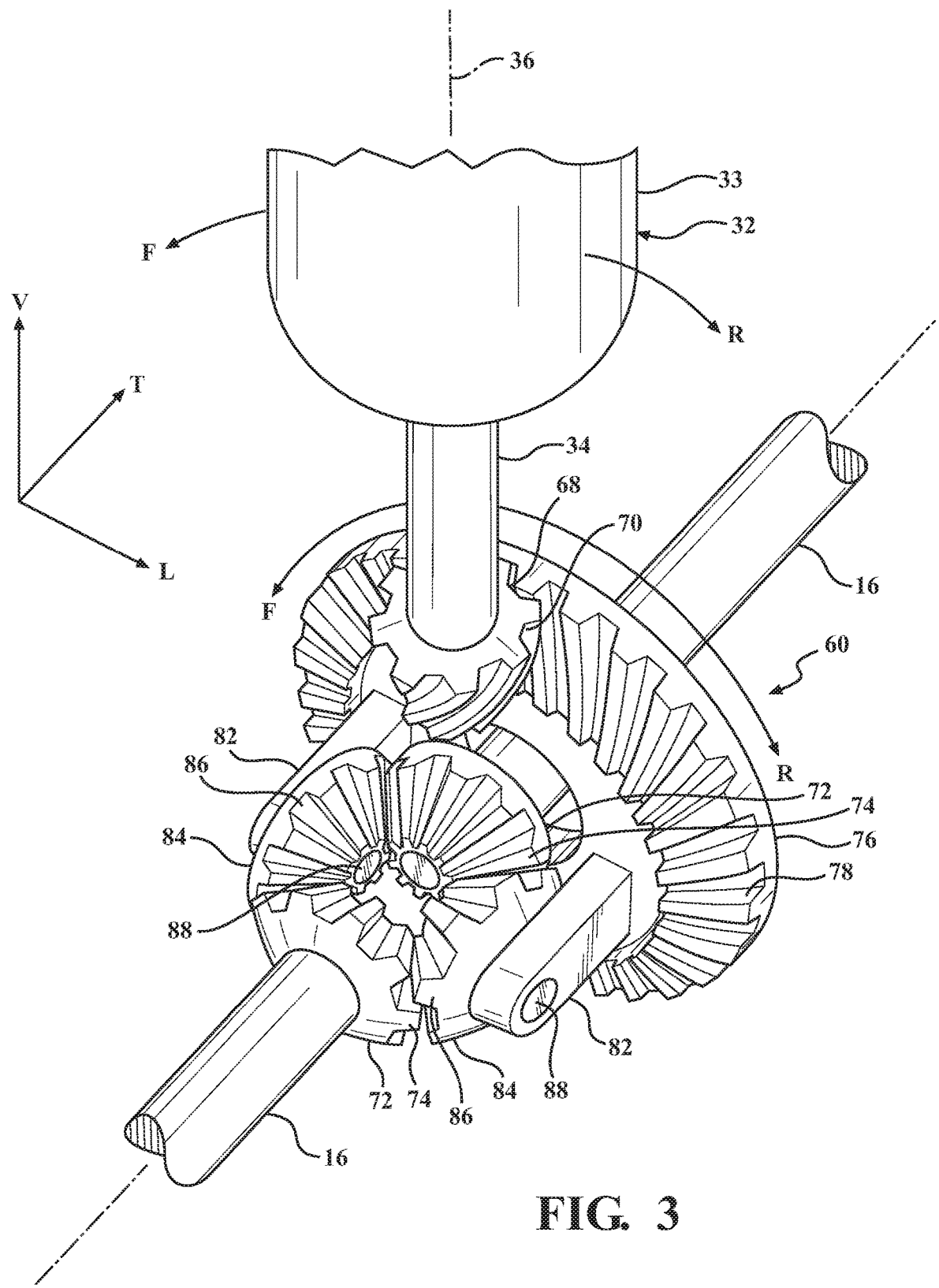
FIG. 3 illustrates a rotatable vehicle drive axle.

In one embodiment, as shown in FIGS. 1-3, for example, the selectively movable differential 60 is disposed on the rotatable vehicle drive axle 16 and is configured to operatively couple the motive power of the selectively movable electric propulsion motor 32 that is transmitted to the rotatable motor shaft 34 to the rotatable vehicle drive axle 16. The selectively movable differential 60 comprises a differential housing 66, which in one embodiment may be substantially spherical, or spherical, and may comprise opposed hemispheres that are selectively attachable to and detachable from one another, such by the use of a plurality of threaded fasteners (not shown) that extend through a corresponding plurality of housing bores 69.

In one embodiment, the selectively movable differential 60 comprises a differential housing 66, a shaft gear 68, which in one embodiment comprises a pinion gear having a plurality of shaft gear teeth 70, attached to the rotatable motor shaft 34 and disposed within the differential housing, and a drive axle gear 72 or gears having a plurality of axle gear teeth 74 attached to the rotatable vehicle drive axle 16 and disposed within the selectively movable differential, wherein the shaft gear and associated gear teeth is operatively coupled to the axle gear(s) 72 and associated axle gear teeth 74. In one embodiment, the shaft gear 68 is operatively coupled to the drive axle gears 72 through a ring gear 76 having a plurality of ring gear teeth 78 that is concentrically and rotatably disposed on the rotatable vehicle drive axle 16, such as through a ring gear bearing (not shown) as is known in the art.

The ring gear 76 and ring gear teeth 78 are configured for reversible rotatable meshed engagement with the shaft gear 68 and shaft gear teeth 70, such that rotation of the rotatable motor shaft 34 and shaft gear 68 produces rotation of the ring gear in a forward (F) or rearward (R) direction as shown in FIG. 3. The ring gear 76 comprises a spider 80 comprising a pair of orthogonally protruding spider arms 82 that are configured to rotatably support a pair of inwardly facing spider gears 84 having a plurality of spider gear teeth 86 that are rotatably disposed on inwardly extending pins 88 by spider bearings (not shown) as known in the art. The spider gears 84 and spider gear teeth 86 are configured for reversible rotatable meshed engagement with the drive axle gears 72 and axle gear teeth 74. Thus, selectively reversible rotation of the rotatable motor shaft 34 of the selectively movable electric propulsion motor 32 produces rotation of the ring gear 76 and spider gears 84 resulting in rotation of the axle gear(s) 72 and the rotatable vehicle drive axle 16, thereby resulting in rotation of the opposed drive wheels 24, 26 and selectively reversible propulsion of the vehicle 10 in a forward or rearward direction.

In one embodiment, the selectively movable electric propulsion motor 32 comprises, and the motor components thereof described herein are housed within, a motor housing 33 that has a cylindrical shape and extends axially along the motor axis 36. The motor housing 33 is configured for selective attachment to and detachment from the differential housing 66. The motor housing 33 may be selectively attached to and detached from the differential housing 66 by any suitable attachment device, which in one embodiment (not shown) comprises a plurality of threaded fasteners that are inserted through plurality of circumferentially spaced bores through a circumferential attachment flange disposed on an open end of the motor housing 33 disposed toward the selectively movable differential 60, and which for attachment are threaded into (or for detachment out of) a corresponding plurality of circumferentially spaced threaded bores in the differential housing 66.

It will be understood that selectively movable electric propulsion motor 32 a selectively movable differential may be used on the vehicle 10 in conjunction with a rotatable vehicle drive axle 16 in any desired manner or location, including as a front axle 28 (e.g. in a front wheel drive vehicle (FWD vehicle)), or a rear axle 30 (e.g. in a rear wheel drive vehicle (RWD vehicle)), or as a front axle and rear axle (e.g. in an all-wheel drive vehicle (AWD vehicle) or four wheel drive vehicle (4WD vehicle)). In one embodiment, both the front axle 28 and the rear axle 30 comprise a selectively movable electric propulsion motor 32 and FWD, RWD, AWD driving modes may be accomplished by powering and using the selectively movable electric propulsion motor 32 disposed on the front axle 28, or the selectively movable electric propulsion motor disposed on the rear axle 30, or both the selectively movable electric propulsion motor disposed on the front axle and the selectively movable electric propulsion motor disposed on the rear axle, respectively. In one embodiment, the front axle 28 comprise a selectively movable electric propulsion motor 32 and a rear axle is an unpowered axle, such as a solid unpowered axle, comprising driven wheels and the vehicle 10 comprises an FWD vehicle. In another embodiment, the rear axle 30 comprises a selectively movable electric propulsion motor 32 and a front axle is an unpowered axle, such as a solid unpowered axle, comprising steerable driven wheels and the vehicle 10 comprises an RWD vehicle.

In one embodiment, as shown in FIGS. 1 and 2A, the vehicle 10 also comprises a motor actuator 62 operatively coupled to the selectively movable electric propulsion motor 32 and the vehicle chassis 12. The motor actuator 62 may comprise any suitable actuator that may be configured to move the selectively movable electric propulsion motor 32 and motor axis 36 radially about the transverse axle axis 18. In one embodiment, the motor actuator 62 may comprise an electrically powered linear actuator 92 that is pivotably attached to the selectively movable electric propulsion motor 32 by a motor pivot 94 and to the vehicle chassis 12 by a chassis pivot 96. Any electrically powered linear actuator 92 configured to provide linear motion sufficient to change the length of the actuator (i.e. selectively increase and decrease the length of the actuator) and thereby cause the selectively movable electric propulsion motor 32 and motor axis 36 to rotate about the transverse axle axis 18 by operation of the motor pivot 94 and chassis pivot 96.

The electrically powered linear actuator 92 may be electrically connected and controlled as described herein. The electrically powered linear actuator 92 may comprise any suitable type of electrically powered linear actuator, including electrical, electromechanical, electropneumatic, and electrohydraulic linear actuators, such as various electromechanical ball screw, leadscrew, and rack and pinion type linear actuators. The positions of motor pivot 94 on the selectively movable electric propulsion motor 32 and chassis pivot 96 on vehicle chassis 12 and the range of movement of the motor actuator 62 may be selected to provide a predetermined angular range of motor movement, which in one embodiment may be angle (α), as described herein. The range of movement of selectively movable electric propulsion motor 32 and motor axis 36 will be selected to include a substantially vertical position, including a vertical position, as described herein.

In another embodiment, as shown in FIGS. 2B and 2C, the motor actuator 62 may comprise an electrically powered rack and pinion actuator 91. The electrically powered rack and pinion actuator 91 comprises a circumferentially extending rack 93 that is concentrically circumferentially disposed about the transverse axle axis 18. The circumferentially extending rack 93 comprises a plurality of rack teeth 95 disposed on an outer edge. In one embodiment, the circumferentially extending rack 93 may be attached to the vehicle chassis 12. The electrically powered rack and pinion actuator 91 also comprises a rack gear 97, such as a pinion gear, comprising a plurality of rack gear teeth 99 that are configured for meshed engagement with the rack teeth 95. The rack gear 97 is attached to the rotatable rack gear shaft 101 of the selectively reversibly rotatable electric rack motor 103, which is attached to the motor housing 33.

The electrically powered rack and pinion actuator 91 and the rotatable electric rack motor 103 may be electrically connected and controlled as described herein. The operation of the rotatable electric rack motor 103 rotates the rack gear 97 and rack gear teeth 99 and their meshed engagement with the rack teeth 95 causes the translation of the rotatable electric rack motor 103 and motor housing 33 along the rack 93 and rotation of the selectively movable electric propulsion motor 32 about the transverse axle axis 18.

The electrically powered rack and pinion actuator 91 may be configured to provide any predetermined angular range of motor movement, which in one embodiment may be angle ($\alpha$), as described herein. As shown in FIGS. 2B and 2C, the electrically powered rack and pinion actuator 91 is particularly configured to provide large ranges of angle ($\alpha$). This includes angle ($\alpha$) up to and including right angles (e.g. 0-90°) forward or rearward (i.e. 0-180° overall) as shown in FIG. 2B. This also includes angle ($\alpha$) up to and including obtuse angles (e.g. 0-120°) forward or rearward (i.e. 0-240° overall) as shown in FIG. 2C. The range of movement of electric propulsion motor 32 and motor axis 36 will be selected to include a substantially vertical position, including a vertical position, as described herein.

The motor actuator 62 is configured to move the selectively movable electric propulsion motor 32 and motor axis 36 from a first position comprising the first direction ($d_1$) of the motor axis 36 to a second position comprising a second direction ($d_2$) of the motor axis, the second position being separated from the first position by the angle ($\alpha$). In one embodiment, the motor actuator 62 is configured to move the selectively movable electric propulsion motor 32 and motor axis 36 from a first radial position about the transverse axle axis 18 comprising a first radial direction ($d_1$) of the motor axis 36 to a second radial position comprising a second radial direction ($d_2$) of the motor axis 36, the second position being separated from the first position by the angle ($\alpha$).

In one embodiment, the selectively movable electric propulsion motor 32 and motor axis 36 is selectively movable from the first position comprising the first direction ($d_1$) of the motor axis to the second position comprising the second direction ($d_2$) of the motor axis where the second position being separated from the first position by the angle ($\alpha$) both while the vehicle 10 is stationary or in motion. In one embodiment, the first radial direction ($d_1$) and first radial position and the second radial direction ($d_2$) and second radial position correspond to a starting position and an ending position, respectively, of a particular movement of the selectively movable electric propulsion motor 32 and the angle ($\alpha$) comprises an angular range of motor movement, and the starting position and an ending position may be reversed.

Furthermore, the first radial direction ($d_1$) and first radial position and the second radial direction ($d_2$) and second radial position may be selected to be any positions within the range of motor movement of selectively movable electric propulsion motor 32. In one embodiment, the angle ($\alpha$) may comprise an acute angle (FIG. 2A), or in another embodiment a right angle (FIG. 2B), or in yet another embodiment an obtuse angle (FIG. 2C). In one embodiment, the angle ($\alpha$) opens forward of the rotatable vehicle drive axle 16 and in another embodiment rearward of the rotatable vehicle drive axle, and in yet another embodiment both forward and rearward of the rotatable vehicle drive axle. It will be understood that the first radial directions ($d_1$) and first radial positions and the second radial directions ($d_2$) and second radial positions may be reversed from those illustrated herein.

The power electronics may be disposed within the selectively movable electric propulsion motor 32, particularly proximate the stator 42, or elsewhere in the vehicle 10, including as a part of a vehicle controller 48 which may comprise a plurality of vehicle controllers, including the motor controller 50, or as part of the vehicle battery 46, or on a standalone basis. The high voltage AC power may be supplied to the selectively movable electric propulsion motor 32 by any suitable inner electrical power and/or signal communication device 52, such as a motor power bus 54 that comprises an electrical conductor configured to electrically communicate high voltage from the power electronics, which may be electrically connected to the selectively movable electric propulsion motor 32 by any suitable electrical power attachment, including an electrical connector 56.

Figure 4:
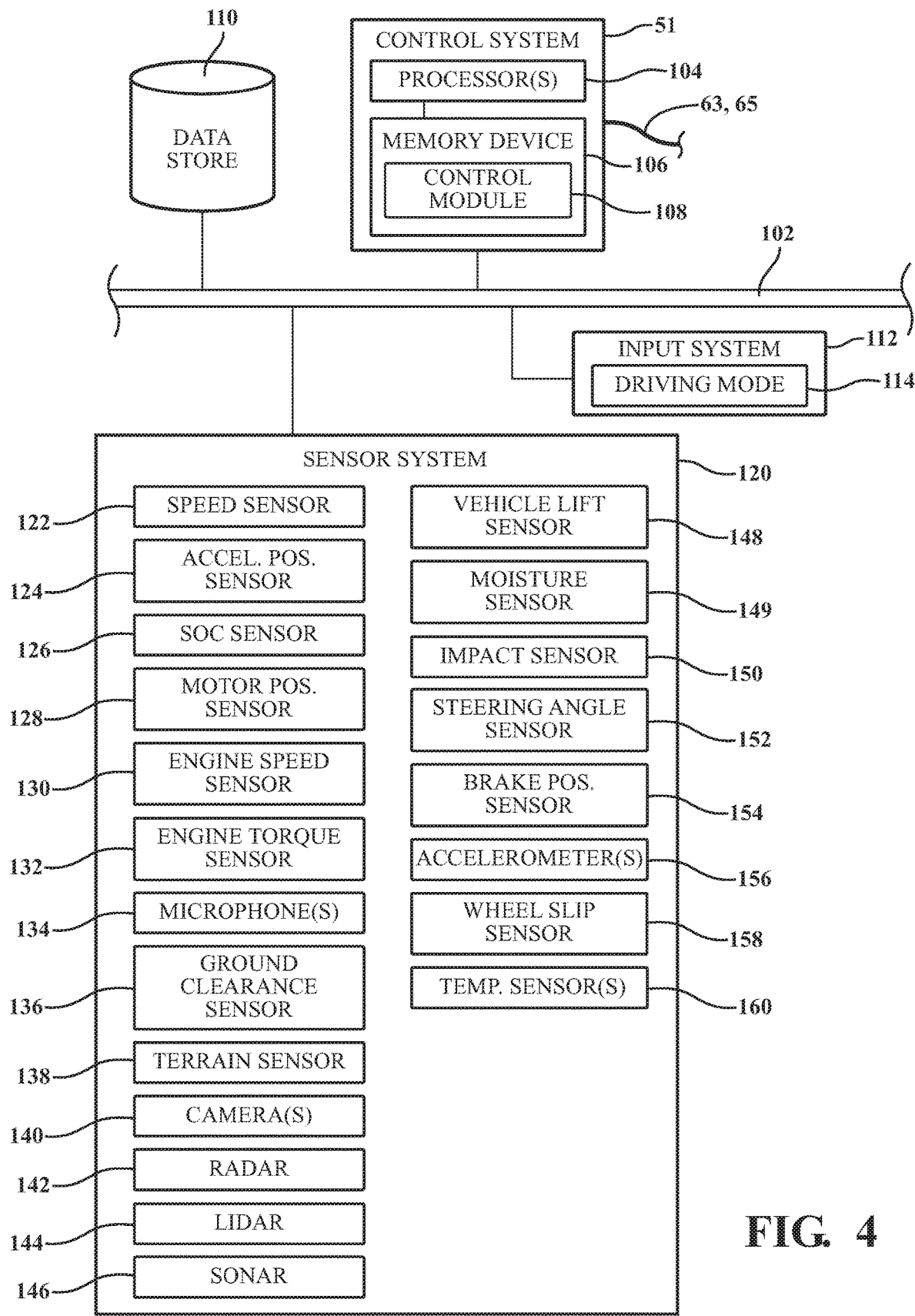
FIG. 4 illustrates a control system to control the position of the selectively movable electric propulsion motor.

Referring to FIG. 4, a control system 51 that can control the motor actuator 62 to control the position of the selectively movable electric propulsion motor 32 is shown. In this example, the control system 51 is in communication with the actuator via the signal communication device 63, which may be an actuator power bus 65. However, it should be understood that any form of communication, either wired or wireless, could be utilized.

The control system 51 may include a processor(s) 104. The processor(s) 104 may be a single processor or may be multiple processors working in concert. Furthermore, it should be understood that the processor(s) 104 may be distributed across multiple systems. In one example, the processor(s) 104 may be distributed throughout the vehicle 10, but, it should be understood that the processor(s) 104 may be located outside the vehicle as a distributed system.

The processor(s) 104 may be in communication with a memory device 106. The memory device 106 may take any one of a number of different forms. In one example, the memory device 106 may be a solid-state memory device, but other types of memory devices may also be utilized. For example, the memory device 106 could be a magnetic storage device, an optical storage device, and the like. Furthermore, it should be understood that while the memory device 106 is shown to be located within the control system 51, the memory device may be located outside the control system 51. Additionally, the memory device 106 may be integrated within the processor(s) 104 or maybe separate as shown.

The memory device 106 contains a control module 108, which includes instructions that cause the processor(s) 104 of the control system 51 to perform any one of a number of different methodologies described in this disclosure. A description of these methodologies will be given after the rest of the components shown in FIG. 4 are described.

The control system 51 may also be in communication with a data store 110. The data store 110 is, in one embodiment, an electronic data structure such as a database that is stored in the memory device 106 or another memory and that is configured with routines that can be executed by the processor(s) 104 for analyzing stored data, providing stored data, organizing stored data, and so on. Thus, in one embodiment, the data store 110 stores data used by the control module 108 in executing various functions.

The control system 51 may be in communication with the data store 110 via a bus 102. The bus 102 may be a physical wired connection that connects the control system 51 to the data store 110 and any one of several different systems connected to the bus 102. Alternatively, the control system 51 may be directly connected to several different components or may be connected to several different components using a wireless methodology.

The control system 51 may also be in communication with a sensor system 120 having a plurality of different sensors that measure different conditions of the vehicle 10. Here, the sensor system 120 is in communication with the control system 51 via the bus 102. However, the sensor system 120 and any sensors making up the sensor system 120 can be in communication with the control system 51 by other methodologies, such as a direct connection or wireless connection. Additionally, it should be understood that while the sensors 122-160 are shown to be part of one sensor system 120, different combinations of the sensors 122-160 may form different sensor systems.

As such, the sensor system 120 may include a speed sensor 122 that may be able to determine the speed of the vehicle 10. The speed sensor 122 may be any type of sensor that is capable of determining the speed of the vehicle 10. In one example, the speed sensor 122 is a wheel speed sensor that determines the overall speed of the vehicle 10 by monitoring the movement of one or more wheels of the vehicle 10.

The sensor system 120 may also include an acceleration position sensor 124 that is able to determine the position of the accelerator of the vehicle 10. The sensor system 120 may also include a state of charge sensor 126 that is able to determine the state of charge of one or more batteries that provide power to the selectively movable electric propulsion motor 32. The sensor system 120 may also include a motor position sensor 128 that can determine the position of the selectively movable electric propulsion motor 32.

If the vehicle 10 is a hybrid electric vehicle and includes an engine, such as an internal combustion engine, the sensor system 120 may also include sensors that measure one or more engine-related variables. For example, the sensor system 120 may include an engine speed sensor 130 that determines the overall engine speed of the engine. The engine speed may be measured in rotations per minute (RPMs). The sensor system 120 may also include an engine torque sensor 132 that can determine the torque output by the engine.

The sensor system 120 may also include sensors that are able to measure the NVH caused by the vehicle 10 during the operation of the vehicle 10. In one example, the sensor system 120 may include one or more microphones 134 that are able to measure noise generated during the operation of the vehicle 10. The one or more microphones 134 may be strategically placed both inside and/or outside the vehicle 10. In one example, the microphones 134 may be utilized to measure the noise experienced by the driver, front passenger, rear passengers, and/or outside the vehicle 10.

The sensor system 120 may also include one or more sensors that are able to determine the overall ground clearance of the vehicle 10. For example, the sensor system 120 may include a ground clearance sensor 136 that is able to determine the distance between the ground and the bottom of the vehicle 10. In one example, the ground clearance sensor 136 may be one or more cameras 140 that are strategically placed on the underside of the vehicle 10 that can visually monitor the distance between the ground and underbody components of the vehicle 10. These underbody components could include the selectively movable electric propulsion motor 32. For example, based on the position of the selectively movable electric propulsion motor 32, the ground clearance between the ground and the selectively movable electric propulsion motor 32 may vary.

In addition to determining the ground clearance of the vehicle 10, the one or more cameras 140 may be able to provide information regarding future ground clearance requirements by capturing images and/or sensing changes in the terrain that is adjacent to the vehicle 10. In one example, if the vehicle 10 is approaching a rocky area, the one or more cameras 140 may be able to measure future ground clearance needs.

In addition to cameras 140, the sensor system 120 may include other sensors that can perceive the environment surrounding the vehicle 10. For example, the sensor system 120 may include a radar 142, light detection and ranging (LIDAR) sensor 144, and/or sonar 146. It should be understood that the sensor system 120 may include more than one of these sensors located at different areas of the vehicle 10.

The sensor system 120 may also include a vehicle lift sensor 148 that can detect the position of the suspension of the vehicle 10. Some vehicles can adjust the suspension to increase and/or reduce ground clearance. The vehicle lift sensor 148 can also be utilized to detect the overall position of the suspension of the vehicle 10.

The sensor system 120 may also include a moisture sensor 149 that can detect moisture experienced by the vehicle 10. In certain cases, the moisture sensor 149 is positioned on the vehicle 10 so that the moisture sensor can detect when the vehicle 10 is entering into a body of water.

The sensor system 120 may also include an impact sensor 150 that can determine if the vehicle 10 is experiencing an impact or collision. The impact sensor 150 may be one or more accelerometers that can measure outside forces acting on the vehicle 10 or may be a switch type sensor that is able to physically determine if one of the body panels of the vehicle 10 have been impacted upon. The sensor system 120 may also include a steering angle sensor 152 and a brake position sensor 154 which are able to determine the steering angle of the steering wheel of the vehicle 10 and the brake position of the brake pedal of the vehicle 10, respectively.

The sensor system 120 may also include one or more accelerometers 156. The one or more accelerometers 156 can perform any one of several different functions related to measuring forces experienced by the vehicle 10. As such, as stated before, the one or more accelerometers 156 may be able to detect if the vehicle 10 has been impacted or in a collision. In addition, the one or more accelerometers 156 may be able to detect vibrations and/or harshness generated by the vehicle 10 during the operation of the vehicle 10. The sensor system 120 may also have a wheel slip sensor 158 that can measure wheel slip of one or more wheels of the vehicle 10.

The sensor system 120 may include one or more temperature sensors 160 that are able to measure the temperature of one or more components of the vehicle 10. For example, one or more temperature sensors 160 may be able to determine the temperature of the selectively movable electric propulsion motor 32, the temperature of an engine of the vehicle 10 if so equipped, the temperature of one or more electrical components, such as an inverter of the vehicle 10, and other components. In some cases, the temperature may be measured directly by the temperature sensors 160 or may be measured indirectly and either extrapolated or interpolated.

The vehicle 10 may also include an input system 112. The input system 112 allows the operator of the vehicle 10 to provide one or more inputs to one or more electrical systems, such as the control system 51 of the vehicle 10. In this example, the input system 112 includes a driving mode input 114. The driving mode input can be an input relating to the type of style that the operator of the vehicle 10 wishes the vehicle 10 to operate in. For example, some vehicles allow the operator to provide a driving mode that is sportier, plusher, better fuel economy, or provide better performance in different environments, such as rain, mud, snow, off-road, dry conditions, paved roads, and the like.

Returning to the control system 51, as stated previously, the memory device 106 includes a control module 108 that has instructions that cause the processor(s) 104 of the control system 51 to perform any one of several different methods disclosed in this specification. Some of the methods that are contained as instructions that form part of the control module 108 are shown in FIGS. 5, 6, 7A-7C, 8A-8C, 9, 10, and/or 11A-11C. The following paragraphs will describe these methods described in these figures from the perspective of the control system 51 of FIG. 4 and the vehicle 10 of FIG. 1. However, it should be understood that this is but one implementation of the methods shown in FIGS. 5, 6, 7A-7C, 8A-8C, 9, 10, and/or 11A-11C.

Figure 5:
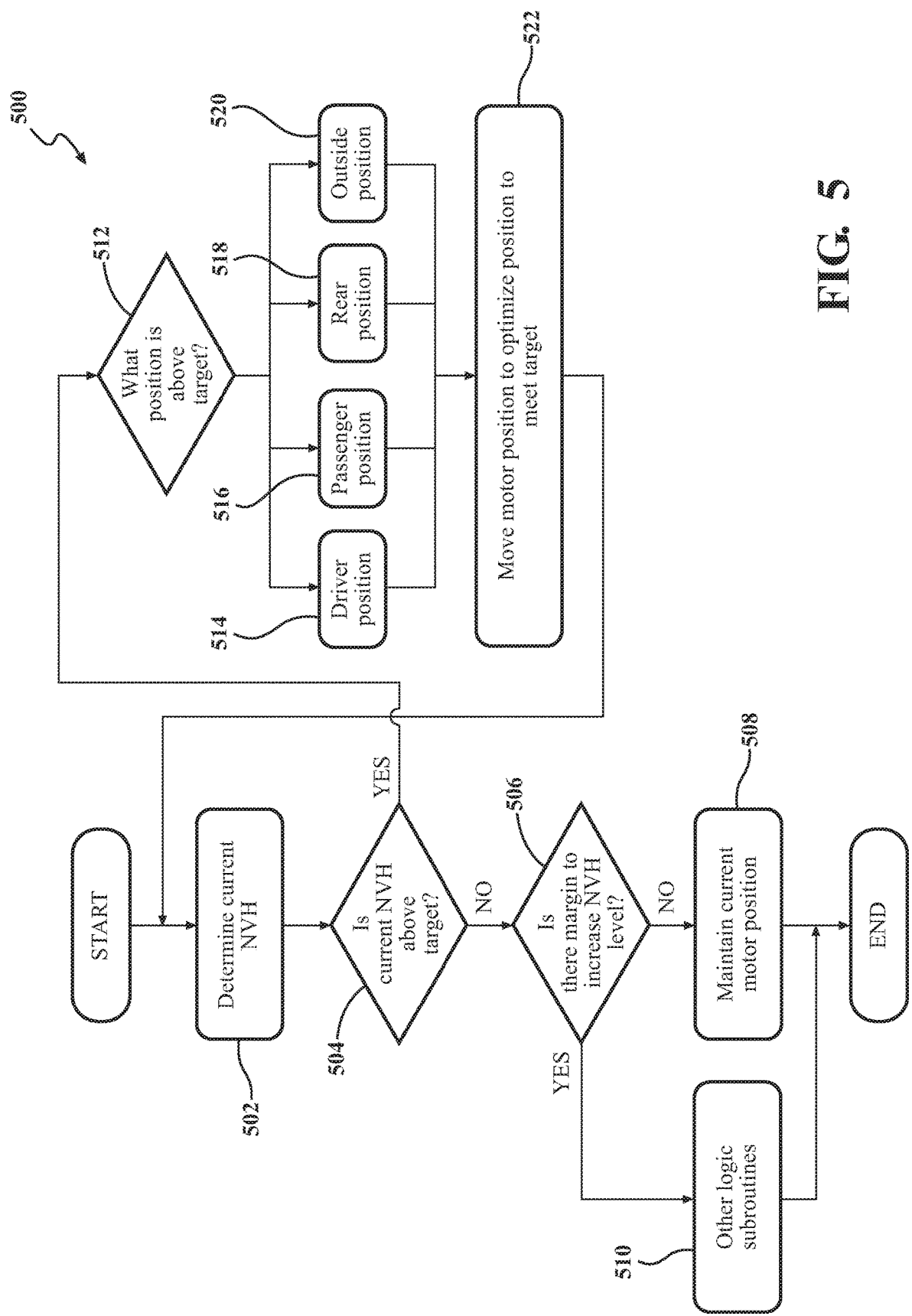
FIG. 5 illustrates a method for reducing NVH of the vehicle by changing the position of the selectively movable electric propulsion motor.

Referring to FIG. 5, a method 500 for reducing NVH of the vehicle 10 is shown. In step 502, the control module 108 causes the processor(s) 104 to determine the NVH generated by the operation of the vehicle 10. A determination of the NVH by the processor(s) 104 may be determined by reviewing measurements performed by the one or more sensors forming the sensor system 120. In one example, the processor(s) 104 may utilize measurements performed by the microphones 134 that may be able to determine the noise experienced by a driver, passenger, occupants in the rear seats of the vehicle, or by persons outside of the vehicle. In addition to utilizing the microphones 134, the processor(s) 104 may also utilize one or more accelerometers 156 that can determine vibrations and/or other harshness related information caused by the vehicle 10 during the operation of the vehicle 10.

In step 504, the method 500 determines if the measured NVH is above a certain target. In one example, the target may include a determination regarding the sound level experienced by occupants located within the vehicle 10 and/or persons outside of the vehicle 10. The target may also include vibration and/or harshness generated by the vehicle 10 during the operation of the vehicle 10. If it is determined that the level of the measured NVH is below a certain target, the method proceeds to step 506, where a determination will be made if the NVH level may be increased. If the NVH level may be increased, other subroutines, as indicated in step 510 may be executed. These other subroutines may increase the NVH level but will generally be below the target NVH level determined in step 504. If there is no additional margin to increase the NVH level, at step 508, the motor position of the selectively movable electric propulsion motor 32 will remain unchanged.

Returning to step 504, if a determination is made that the NVH level is above a target, the method 500 proceeds to step 512. At step 512, a determination is made regarding where the NVH is above the target. For example, the determination may be made that the NVH is above a driver position 514, a passenger position 516, a rear occupant position 518, and/or an outside position 520. Based on the determination of which position or positions are experiencing NVH above the target, the method 500 proceeds to step 522, wherein the selectively movable electric propulsion motor 32 is moved from a first position to a second position. As stated before, the selectively movable electric propulsion motor 32 may be moved into position using one or more actuators 62. The position that the selectively movable electric propulsion motor 32 is moved into may be determined by either experimentation and moving the selectively movable electric propulsion motor 32 into different positions and then taking NVH measurements to determine if an improvement is shown, or may be determined using a lookup table. Thereafter, the method 500 may return to step 502.

Figure 6:
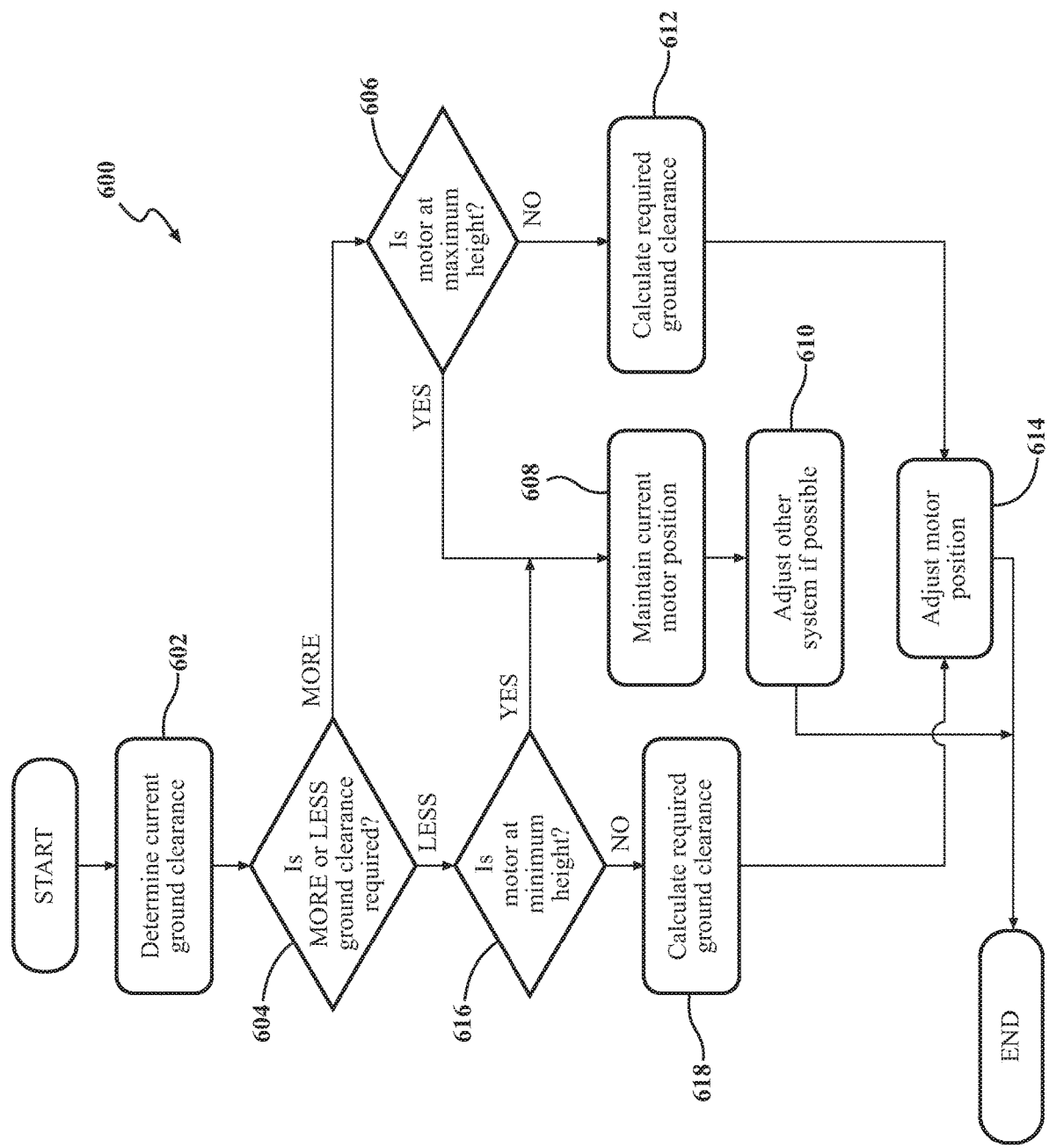
FIG. 6 illustrates a method for improving ground clearance by changing the position of the selectively movable electric propulsion motor.

Referring to FIG. 6, a method 600 for moving the selectively movable electric propulsion motor 32 to improve ground clearance is shown. The method 600 may be in the form of instructions that are stored in the control module 108 and cause the processor(s) 104 to perform any of the functions described below. The method 600 will be described from the point of view of the control system 51 of FIG. 4 and the vehicle 10 of FIG. 1. However, it should be understood that the method 600 may be implemented in any one of a number of different implementations.

The method 600 begins at step 602, wherein the control module 108 causes the processor(s) 104 to determine the current ground clearance of the vehicle 10. Several different inputs may be utilized by the processor(s) 104 of the control system 51 to determine the current ground clearance of the vehicle 10. For example, one or more sensors of the sensor system 120 may provide information to the processor(s) 104 that the processor(s) 104 may be able to utilize to determine the current ground clearance of the vehicle 10. For example, the ground clearance sensor 136, the terrain sensor 138, the cameras 140, the radar 142, the LIDAR 144 and/or the sonar 146 may each provide information regarding the current ground clearance of the vehicle 10. In addition to the sensors, other information may be utilized as well, such as information from the speed sensor 122, information from the accelerator position sensor 124, the state of charge sensor 126, and/or the motor position sensor 128.

After a determination is made regarding the current ground clearance, the method 600 proceeds to step 604, wherein a determination is made if more or less ground clearance is required. The control module 108 may cause the processor(s) 104 to make a determination if more or less ground clearance is required by utilizing one or more sensors of the sensor system 120. For example, information from the ground clearance sensor 136, the terrain sensor 138, the cameras 140, the radar 142, the LIDAR 144, and/or the sonar 146 may be utilized by the processor(s) 104 to determine ground clearance requirements of upcoming terrain.

If it is determined that more clearance is required, the method 600 proceeds to step 606, wherein the control module 108 causes the processor(s) 104 to determine if the selectively movable electric propulsion motor 32 is at a maximum height relative to the ground. This may be determined by utilizing the motor position sensor 128 to provide information to the processor(s) 104. The processor(s) 104 can determine based on information from the motor position sensor 128 if the selectively movable electric propulsion motor 32 is at a maximum height.

It is determined that the motor is at a maximum height, the method 600 proceeds to step 608, wherein the processor(s) 104 of the control system 51 determines that the selectively movable electric propulsion motor 32 should maintain the current motor position and should not be moved. In step 610, the control module 108 causes the processor(s) 104 to adjust other systems if possible to improve ground clearance. In one example, the processor(s) 104 may be able to adjust the right height of the vehicle 10 by adjusting the suspension.

Going back to step 606, if it is determined at step 606 that the selectively movable electric propulsion motor 32 is not at its maximum height, the method 600 proceeds to step 612. At step 612, the control module 108 causes the processor(s) 104 to calculate a required ground clearance. Thereafter, the method 600 proceeds to step 614, wherein the control module 108 causes the processor(s) 104 to instruct the motor actuator 62 to adjust the position of the selectively movable electric propulsion motor 32. In this example, because additional ground clearance has been determined to be required, the control module 108 causes the processor(s) 104 to instruct the motor actuator 62 to move the selectively movable electric propulsion motor 32 such that ground clearance is improved. The situation may occur when the selectively movable electric propulsion motor 32 is the lowest point of the vehicle 10 and therefore by moving it, the selectively movable electric propulsion motor 32 is no longer the lowest point of the vehicle 10, thus improving ground clearance.

Returning to step 604, if it is determined that less ground clearance is acceptable, the method 600 proceeds to step 616, wherein the control module 108 causes the processor(s) 104 to determine if the selectively movable electric propulsion motor 32 is at a minimum height. If it is determined that the motor 32 is at a minimum height, the method proceeds to step 608, which was previously described. Otherwise, the method 600 may proceed to step 618, wherein the control module 108 causes the processor(s) 104 to calculate required ground clearance. Thereafter, the method 600 and may proceed to step 614 where the selectively movable electric propulsion motor 32 is adjusted. In this example, the selectively movable electric propulsion motor 32 may be moved by the motor actuator 62 to reduce ground clearance if there are some advantages to doing so, such as improved cooling, aerodynamics, fuel consumption, and the like.

Figure 7B:
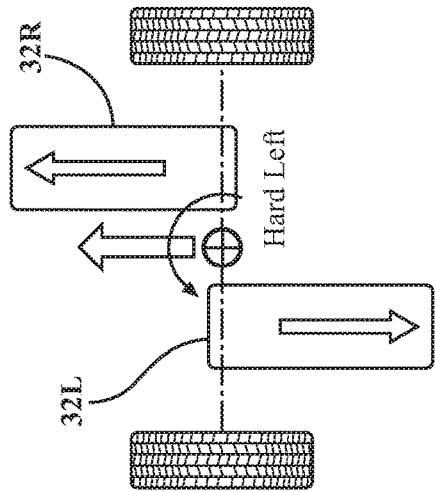
FIGS. 7A-7C illustrates a method for improving turning performance of a vehicle by changing the position of two selectively movable electric propulsion motors.
Figure 7C:
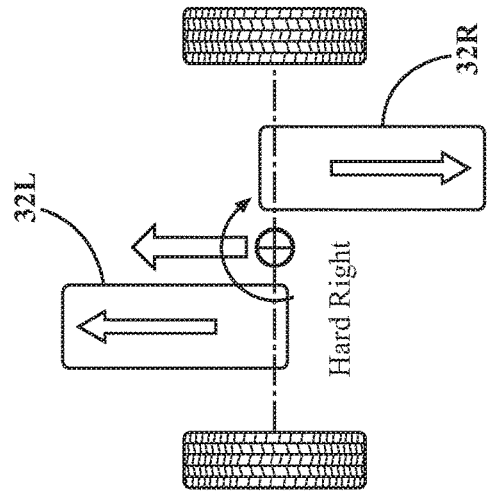
Figure 7A:
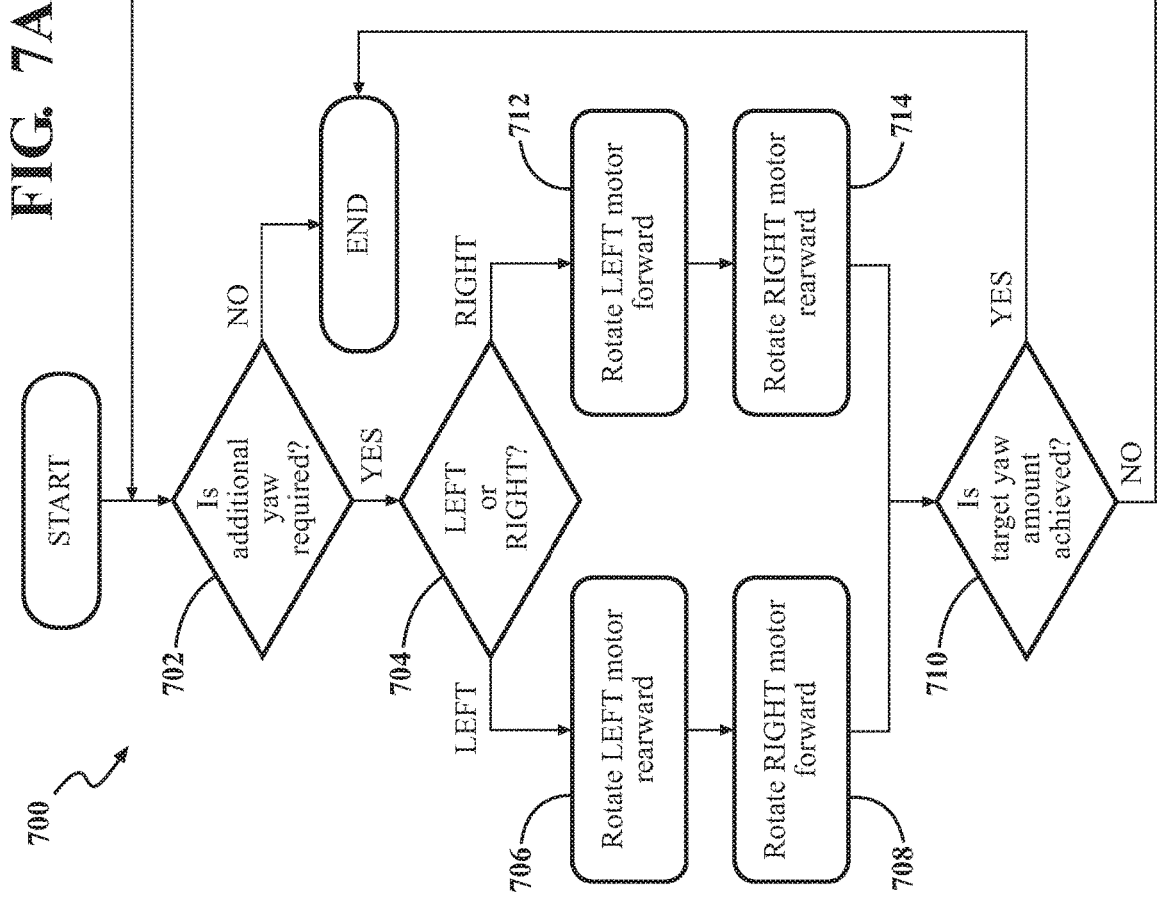

Referring to FIG. 7A, a method 700 for controlling to selectively movable electric propulsion motors is shown. The method 700 will be described from the perspective of the control system 51 of FIG. 4 and the vehicle 10 of FIG. 1. In addition, for ease of understanding, FIGS. 7A and 7B illustrate simplified diagrams of a vehicle powertrain having two selectively movable electric propulsion motors 32L and 32R. The selectively movable electric propulsion motor 32L is generally located on the left side of a vehicle, such as the vehicle 10, while the selectively movable electric propulsion motor 32R is generally located on the right side of the vehicle. As will be explained later, the movement of one or both electrical motors 32 L and 32R can improve handling when the vehicle 10 is turning left or right.

The method 700 begins at step 702, wherein the control module 108 causes the processor(s) 104 to determine if additional yaw is required. Additional yaw may be required when the vehicle is performing a turn. A determination can be made based on information received from the sensor system 120. For example, one or more accelerometers 156 may provide information to the processor(s) 104 regarding current forces, such as the yaw rate, acting on the vehicle 10. In addition, other sensors may also be utilized, such as the speed sensor 122, the accelerator position sensor 124, and the steering angle sensor 152. Further, input from the driver may be utilized as well, such as the driving mode 114. For example, the driver of the vehicle 10 may want the vehicle to perform more aggressive turning maneuvers.

In step 704, the control module 108 causes the processor(s) 104 to determine if the vehicle 10 is turning left or right. A determination of this may be made by evaluating information from the steering angle sensor 152, the accelerometers 156, or other sensors. In the event that the vehicle 10 is turning left, the control module 108 causes the processor(s) 104 to rotate via the motor actuator 62 the selectively movable electric propulsion motor 32L rearward, towards the center of the vehicle 10, as indicated in step 706. In step 708, the control module 108 causes the processor(s) 104 to rotate the selectively movable electric propulsion motor 32R forward, away from the center of the vehicle 10. The position of the selectively movable electric propulsion motors 32L and 32R after step 706 and 708 are completed is shown in FIG. 7B. It should be understood that the steps 708 and/or 706 may be performed at the same time or in a different order. Thereafter, in step 710 the control module 108 causes the processor(s) 104 to determine if a target yaw rate is achieved. This may be determined by evaluating information from the accelerometers 156. If the target yaw rate is achieved, the method 700 ends. Otherwise, the method 700 returns to step 702.

Returning to step 704, if it is determined that the vehicle 10 is turning right, the control module 108 causes the processor(s) 104 to rotate via the motor actuator 62 the left selectively movable electric propulsion motor 32L forward, away from the center of the vehicle 10, as indicated in step 712. In step 714, the control module 108 causes the processor(s) 104 to rotate via the motor actuator 62 the right selectively movable electric propulsion motor 32R rearward, towards the center of the vehicle 10. Thereafter, the method 700 proceeds to step 710, which was previously described. Like before, steps 712 and/or 714 may be performed in any order or at the same time.

Figure 8B:
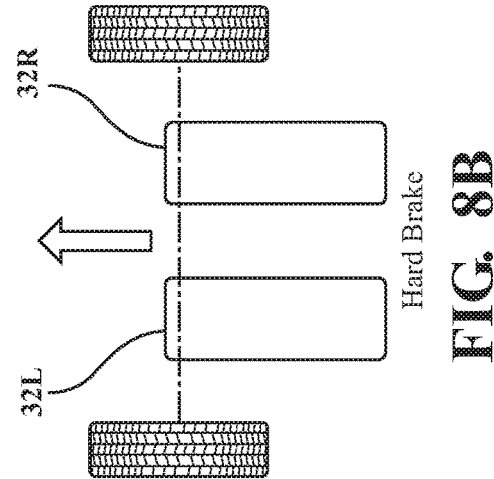
FIGS. 8A-8C illustrates a method for improving comfort/grip by reducing/increasing a vehicle pitch of the vehicle by changing the position of at least one movable electric propulsion motor during a braking/acceleration operation.
Figure 8C:
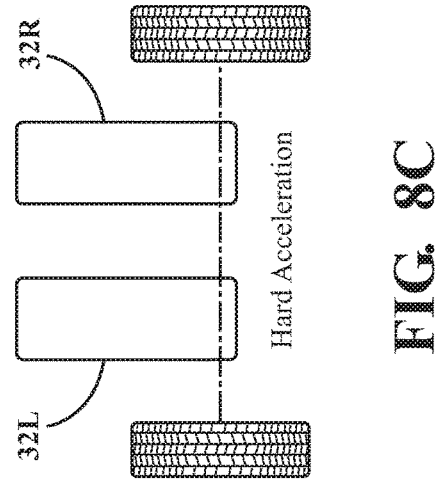
Figure 8A:
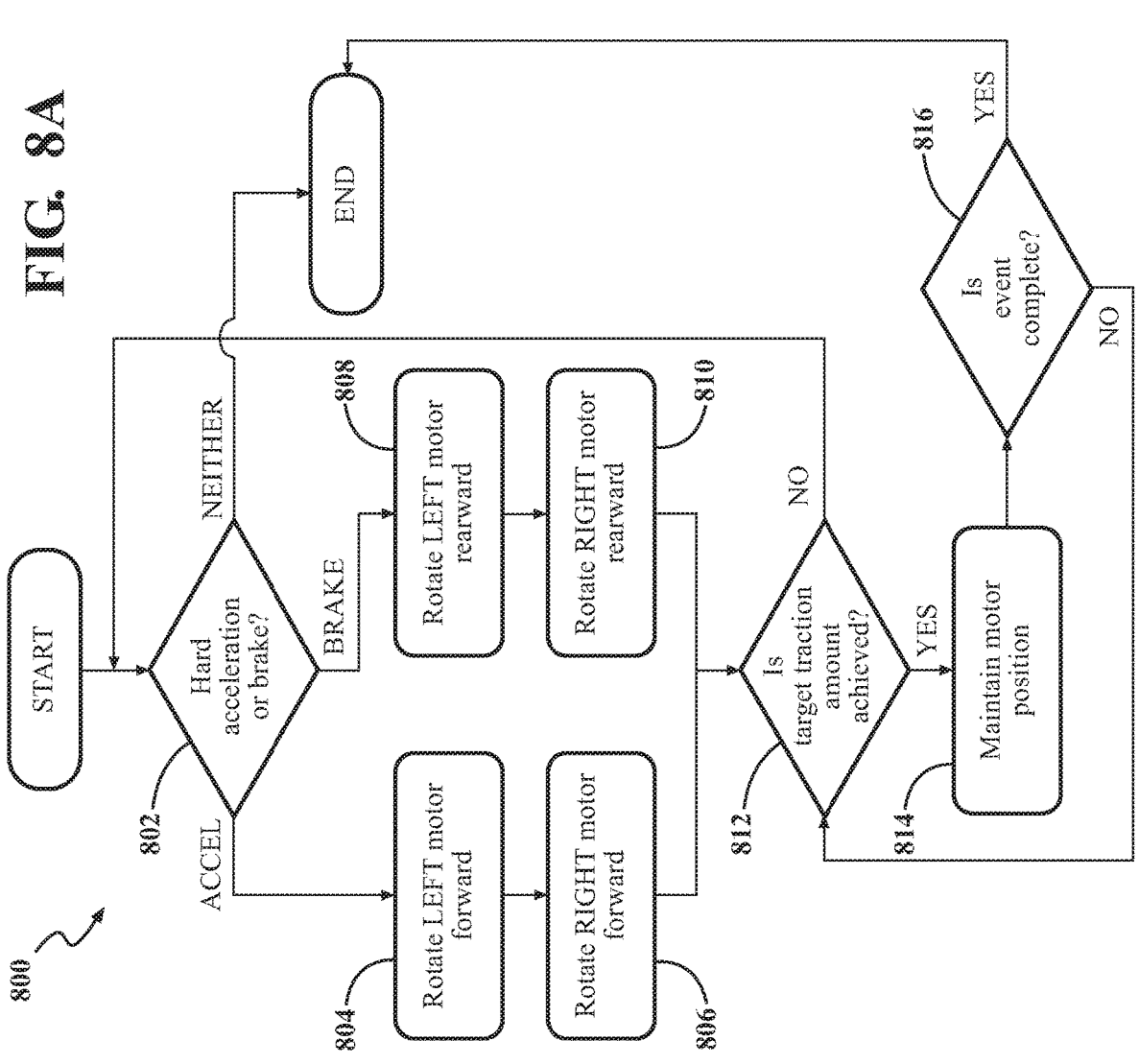

Referring to FIG. 8A, a method 800 for improving the braking performance of the vehicle 10 by moving one or more selectively movable electric propulsion motors, such as motors 32L and 32R of FIGS. 8B and 8C is shown. The method 800 will be described from the perspective of the control system 51 of FIG. 4 and the vehicle 10 of FIG. 1. However, like before, it should be understood that this is but one implementation of the method 800.

The method 800 begins at step 802, wherein the control module 108 causes the processor(s) 104 to determine if a hard acceleration or braking is being performed by the vehicle 10. The processor(s) 104 may be able to determine this condition by using information for many of the sensors of the sensor system 120. In particular, the processor(s) 104 may utilize information from the accelerator position sensor 124 and/or the brake position sensor 154. Further, other sensors may be utilized, such as the accelerometers 156 that can determine if the vehicle is accelerating or decelerating. It should be understood that accelerating in this disclosure means forward acceleration, while deceleration means rearward acceleration.

If it is determined that the vehicle 10 is accelerating, the method proceeds to step 804, and 806, wherein the one or more selectively movable electric propulsion motors, such as motors 32L and 32R are moved by the motor actuator 62 forward, away from the center of the vehicle 10. One example of the position of the motors 32L and 32R is shown in FIG. 8C. It should be understood that the steps 804 and 806 may occur in a different order or may occur at the same time. Further, if the vehicle 10 only has a single motor, then only one step would be performed, while, conversely, if the vehicle 10 has more than two motors, more steps may be performed.

Similarly, if it is determined that the vehicle is braking, the method 800 proceeds to steps 808 and 810, wherein the motor actuator 62 moves the one or more selectively movable electric propulsion motors rearward, towards the center of the vehicle 10. One example of the position of the motors 32L and 32R is shown in FIG. 8B Like before, the steps 808 and 810 may be performed in any order or at the same time. Furthermore, if the vehicle 10 only has one motor, only one-step be performed while, on the other hand, if the vehicle has more than two motors, more than two steps may be required.

Thereafter, the method 800 proceeds to step 812, wherein the control module 108 causes the processor(s) 104 to determine if a target traction amount is received. This determination may be made based on information from any the sensors of the sensor system 120. In particular, the processor(s) 104 may use information from the wheel slip sensor 158 and/or the accelerometers 156 to determine if target traction has been achieved. Other sensors may also be utilized, such as the speed sensor 122. If it is determined that the target traction amount has not been achieved, the method proceeds back to step 802. Otherwise, the method proceeds to step 814 wherein the motor position of the one or more selectively rotatable electric motors is maintained, as indicated in step 814. One example of the position of the motors 32L and 32R is shown in FIG. 8C.

The method 800 may also include step 816, wherein the control module 108 causes the processor(s) 104 to determine if the event such as a turning event of the vehicle 10 is complete. If the turning event is complete, the method 800 may end, otherwise, the method 800 returns to step 812.

The method 800, in the implementation described above, may improve the comfort to any occupants of the vehicle 10 by reducing the vehicle pitch experienced by the vehicle 10 when performing a hard braking and/or hard acceleration action. However, the method 800 may also be modified so to improve grip, as opposed to comfort. Moreover, the method 800 would be modified so that during a hard braking action by the vehicle 10, the one or more selectively movable electric propulsion motors, such as motors 32L and 32R, are moved forward, away from the center of the vehicle 10 to improve grip. Similarly, during a hard acceleration action, the method 800 would be modified so that the one or more selectively movable electric propulsion motors, such as motors 32L and 32R, are moved rearward, toward the center of the vehicle 10 to improve grip.

Figure 9:
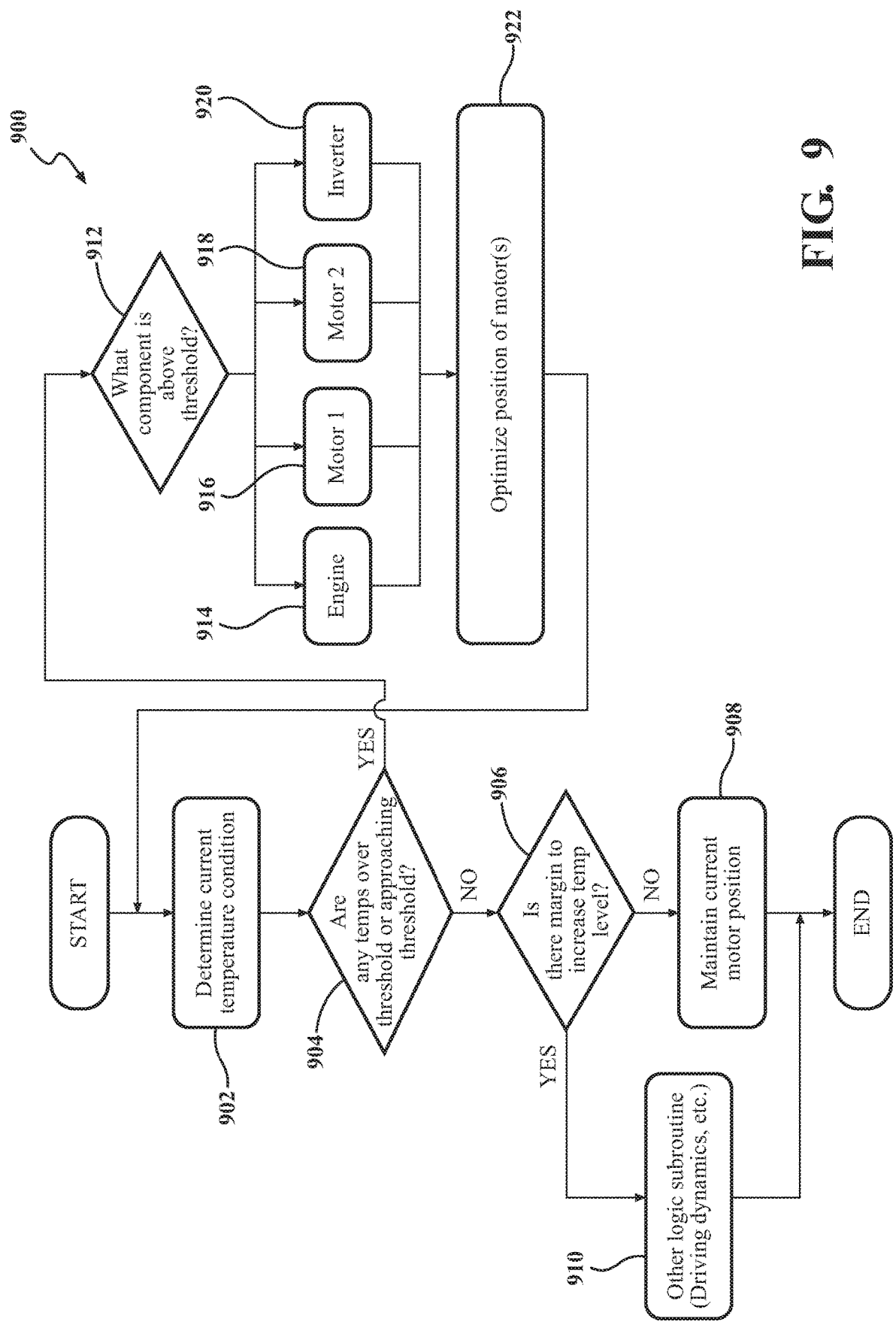
FIG. 9 illustrates a method for improving temperatures experienced by one or more components of a vehicle by changing the position of the selectively movable electric propulsion motor.

Referring to FIG. 9, a method 900 for improving the cooling performance of the vehicle 10 by moving one or more selectively movable electric propulsion motors is shown. The method 900 is described from the viewpoint of the control system 51 of FIG. 4 and the vehicle 10 of FIG. 1. However, it should be understood that this is but one implementation of the method 900 and other implementations may be utilized.

In step 902, the control module 108 causes the processor(s) 104 to determine a current temperature condition. The current temperature condition may be determined by evaluating information from one or more sensors of the sensor system 120. For example, the processor(s) 104 may receive information from the temperature sensors 160. The temperature sensors 160 may measure the temperature of the engine (if the vehicle 10 is a hybrid electric vehicle), one or more selectively movable electric propulsion motors 32, an inverter, a battery, transaxle of the vehicle 10 and the like. In addition to this information, the processor(s) 104 may be provided information from the sensor system 120 related to the selectively movable electric propulsion motor 32, such as speed, torque, and position.

In step 904, the control module 108 causes the processor(s) 104 to determine if any of the temperatures measured are over a threshold or are approaching a threshold. If it is determined that no temperatures are over a threshold or are approaching a threshold, the method 900 proceeds to step 906, wherein the processor(s) 104 may determine if there is a margin to increase the temperature level. If there is no margin to increase the temperature level, the processor(s) 104 will maintain the current motor position of the one or more selectively movable electric propulsion motors 32, as indicated in step 908. Otherwise, the processor(s) 104 may perform other subroutines such as changing driving dynamics or other things that may increase the temperature level but not so much that it exceeds a threshold, as indicated in step 910.

Returning to step 904, if it is determined that any temperatures are over a threshold or are approaching a threshold, the method proceeds to step 912. In step 912, the control module 100 and a causes the processor(s) 104 to determine which component of the vehicle 10 is above a temperature threshold. These components could include an engine 914, a first selectively movable electric propulsion motor 916, a second selectively movable electric propulsion motor 918, an inverter 920, or other components wherein a temperature measurement was performed.

In step 922, the control module 108 causes the processor(s) 104 to optimize the position of the one or more selectively movable electric propulsion motors 32. The position of the selectively movable electric propulsion motors 32 may be performed by experimenting, such as moving the motor 32 into a variety of different positions and then determining the temperature of one or more components. If an improvement is observed, the motor 32 may loan longer be moved or may be continued to be moved to see if further improvements can be obtained. In addition to experimentation, a lookup table may be utilized that indicates the position of the motor 32 that improves cooling performance. Thereafter, the method may return to step 902, which was previously described.

Figure 10:
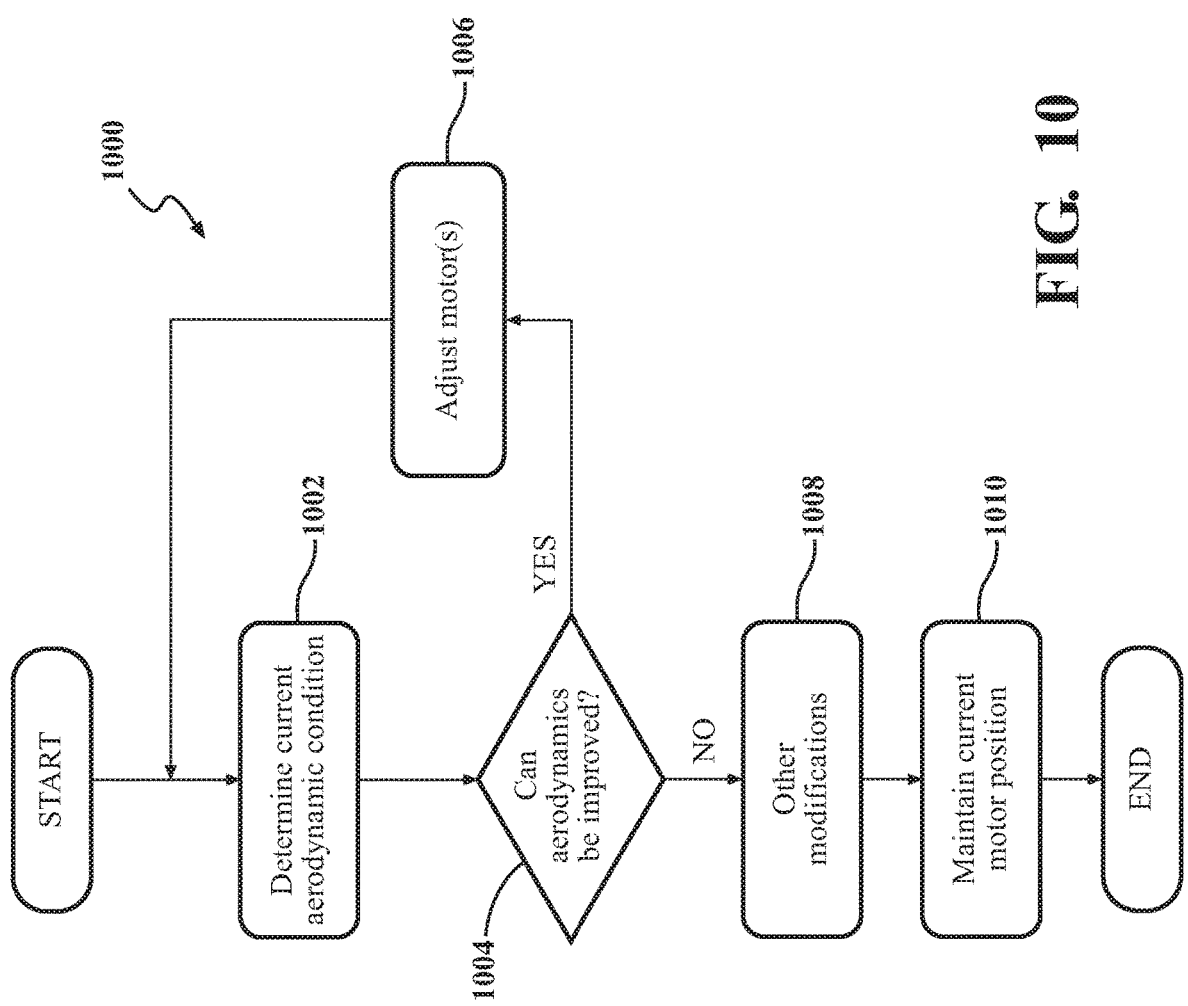
FIG. 10 illustrates a method for improving the aerodynamics of a vehicle by changing the position of the selectively movable electric propulsion motor.

Referring to FIG. 10, a method 1000 for improving the aerodynamics of the vehicle 10 by moving one or more selectively movable electric propulsion motors 32 is shown. The method 1000 is described in the perspective of the control system 51 of FIG. 4 and the vehicle 10 of FIG. 1. However, it should be understood, that this is but one implementation of the method 1000.

The method 1000 begins at step 1002, wherein the control module 108 causes the processor(s) 104 to determine a current aerodynamic condition of the vehicle 10. The current aerodynamic condition of the vehicle 10 may be determined by evaluating one or more sensors of the sensor system 120. Moreover, information relating to the speed of the vehicle, acceleration position, state of charge, current motor position, current suspensions position, current ground clearance, driving mode, and the driving force required to move the vehicle 10 forward may be considered.

At step 1004, the control module 108 causes the processor(s) 104 to make a determination if aerodynamics can be improved. A determination regarding improving aerodynamics may be determined by evaluating one or more of the sensors of the sensor system 120. In addition, a control hierarchy may be utilized to determine if there is potential to modify for improved aerodynamic benefit. If it is determined that the aerodynamics can be improved, the method 1000 proceeds to step 1006 wherein the control module 108 causes the processor(s) 104 to adjust the position of one or more components. In this example, the one or more components may be one or more selectively movable electric propulsion motors 32. Thereafter, the method 1000 returns to step 1002.

If it is determined that the aerodynamics cannot be improved, the method proceeds to step 1008 wherein the control module 108 may cause the processor(s) 104 to modify other vehicle systems, such as the suspension of the vehicle 10 and likewise. Thereafter, in step 1010, the method 1000 makes determination to maintain the current motor position.

Referring to FIG. 11A-11C, a method 1100 for reducing torque ripple by moving one or more selectively movable electric propulsion motors, such as electric motors 32L, 32M, and 32R is shown. Like before, the method 1100 will be explained from the viewpoint of the control system 51 of FIG. 4 and the vehicle 10 of FIG. 1. Further, special mention is made regarding FIG. 11C. In this example, the vehicle includes three electric motors that are selectively movable. Two of the electric motors, motors 32L and 32R are utilized to drive the drivetrain of the vehicle 10. A third motor, motor 32M is a torque ripple motor located between the motors 32L and 32R. The torque ripple motor 32 M essentially asked to counter the vibrations caused by the motors 32 L and 32 R, as indicated in FIG. 11B. Moreover, FIG. 11B illustrates vibrations 1102, 1104, and 1106 caused by the motors 32L, 32R, and 32M, respectively. The net effect of utilizing a torque ripple motor 32M is shown as net effect 1108. As can be seen in FIG. 11B, the net effect of the vibrations 1102, 1104, and 1106 is fairly minimal and is improved by the vibrations 1106 caused by the torque ripple motor 32M.

The method 1100 begins at step 1110, wherein the control system 108 causes the processor(s) 104 to determine a current torque ripple condition. The current torque ripple condition may be determined by the processor(s) 104 for information from any one of the sensors forming the sensor system 120. Moreover, information regarding the vehicle speed, accelerator position, state of charge, position of any of the motors, speed of any they motors, torque a pay them motors may be utilized. In step 1112 the control module 108 causes the processor(s) 104 to determine if the torque ripple is above a certain threshold. If the torque ripple is above a certain threshold, the method proceeds to step 1114 wherein at least one of the electric motors 32L, 32R, and/or 32M are moved. In step 1116, another determination is made if the torque ripple is above a threshold. In the case that the torque ripple is above a threshold, the method proceeds to step 1118 wherein another adjustment of one or more of the motors 32L, 32R, and/or 32M is made. Thereafter, the method returns to step 1112. If it is determined in steps 1112 and/or 1116 that the torque ripple is not above a threshold, the method proceeds to step 1120, wherein the current motor position of the motors 32L, 32R, and/or 32M is maintained.

As stated above, there are several methods for controlling the one or more selectively movable electric propulsion motor 32 to improve areas such as handling, aerodynamics, temperature, ground clearance, among others. Generally, the above methods may be combined in a system that allows the adjustment of all of these different areas or may be utilized independently of each other. In a system that combines multiple methods described above, a priority may be established as to which method should be executed and deemed the most valuable. In one example, the order of priority may be safety, part protection, efficiency, and finally, performance. With regard to safety, priority could be given to methods that deal with the handling of the vehicle, such as described in methods 700 and 800. With regards to part protection, these could involve the methods 900 and 600, which relate to ground clearance and temperature. With regards to efficiency, this could involve the method 1000, which relates to aerodynamics. As to performance, this could involve the methods 500, 1100, which relate to NVH and torque ripple, or methods related to driving performance outside of safety, such as methods 700 and 800.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer readable program code embodied, e.g., stored, thereon. Any combination of one or more computer-readable media may be utilized. The computer-readable medium may be a computer readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A powertrain for a vehicle comprising:
   a rotatable vehicle drive axle;
   at least one selectively movable electric propulsion motor comprising a rotatable motor shaft rotatable about an axis defined by the rotatable vehicle drive axle, the at least one selectively movable electric propulsion motor operatively coupled to the rotatable vehicle drive axle, wherein the at least one selectively movable electric propulsion motor is configured to be mounted within a chassis of the vehicle;
   a motor actuator connected to the at least one selectively movable electric propulsion motor, the motor actuator configured to move the at least one selectively movable electric propulsion motor about the axis defined by the rotatable vehicle drive axle; and
   a control system in communication with the motor actuator and having a memory device in communication with the control system, the memory device storing a control module having instructions that when executed by the control system causes the control system to:
      receive at least one input from at least one sensor, and
      instruct the motor actuator to rotate the at least one selectively movable electric propulsion motor based on the at least one input.

2. The powertrain of claim 1, wherein the control module further comprises instructions that when executed by the control system causes the control system to:
   determine a noise, vibration, and harshness level from noise, vibration, and harshness information from the at least one sensor,
   determine if the noise, vibration, and harshness level is above a target level, and
   instruct the motor actuator to rotate the at least one selectively movable electric propulsion motor from a first position to a second position when the noise, vibration, and harshness level is above the target level.

3. The powertrain of claim 2, wherein the noise, vibration, and harshness information includes at least one of: a noise level at a driver position, a noise level at a front passenger position, a noise level at a rear passenger position, and a noise level external to the vehicle.

4. The powertrain of claim 1, wherein the control module further comprises instructions that when executed by the control system causes the control system to:
   determine a current ground clearance of the vehicle,
   determine when additional ground clearance is required based on ground clearance information from the at least one sensor,
   determine when the at least one selectively movable electric propulsion motor can be moved to improve ground clearance, and
   instruct the motor actuator to rotate the at least one selectively movable electric propulsion motor from a first position to a second position when additional ground clearance is required and the at least one selectively movable electric propulsion motor can be moved to improve ground clearance.

5. The powertrain of claim 4, wherein the ground clearance information from the at least one sensor includes one or more images of a terrain that is adjacent to the vehicle.

6. The powertrain of claim 1, wherein the control module further comprises instructions that when executed by the control system causes the control system to:
   determine vehicle driving dynamic information from at least one sensor, the vehicle driving dynamic information being based, in part, on a position of the at least one selectively movable electric propulsion motor, and
   instruct the motor actuator to rotate the at least one selectively movable electric propulsion motor from a first position to a second position based on the vehicle driving dynamic information.

7. The powertrain of claim 6, wherein vehicle driving dynamic information includes at least one of: a speed of the vehicle, an acceleration position of the vehicle, a state of charge of the vehicle, a current position of the at least one selectively movable electric propulsion motor, a steering angle of the vehicle, a driving mode of the vehicle, a wheel slip of the vehicle, and a yaw rate of the vehicle.

8. The powertrain of claim 6, wherein:
   the at least one selectively movable electric propulsion motor includes a right selectively movable electric propulsion motor and a left selectively movable electric propulsion motor; and
   the control module further comprises instructions that when executed by the control system causes the control system to:
      determine based on the vehicle driving dynamic information when the vehicle is turning at least one of left and right,
      when the vehicle is turning right, rotate the left selectively movable electric propulsion motor rearward of the rotatable vehicle drive axle and rotate the right selectively movable electric propulsion motor forward of the rotatable vehicle drive axle, and
      when the vehicle is turning left, rotate the right selectively movable electric propulsion motor rearward of the rotatable vehicle drive axle and rotate the left selectively movable electric propulsion motor forward of the rotatable vehicle drive axle.

9. The powertrain of claim 6, wherein the control module further comprises instructions that when executed by the control system causes the control system to:
   determine based on the vehicle driving dynamic information when the vehicle is at least one of decelerating and accelerating,
   when the vehicle is accelerating, rotate the at least one selectively movable electric propulsion motor forward of the rotatable vehicle drive axle, and
   when the vehicle is decelerating, rotate the at least one selectively movable electric propulsion motor rearward of the rotatable vehicle drive axle.

10. The powertrain of claim 1, wherein the control module further comprises instructions that when executed by the control system causes the control system to:
    determine a vehicle operating temperature from the at least one sensor, and
    instruct the motor actuator to rotate the at least one selectively movable electric propulsion motor from a first position to a second position when the vehicle operating temperature is above a target temperature.

11. The powertrain of claim 10, wherein vehicle operating temperature includes at least one of: an internal combustion engine temperature, a temperature of the at least one selectively movable electric propulsion motor, an inverter temperature, a transmission temperature, a battery temperature.

12. The powertrain of claim 1, wherein the control module further comprises instructions that when executed by the control system causes the control system to:
    determine vehicle aerodynamic information from at least one sensor, the vehicle aerodynamic information being based on a position of the at least one selectively movable electric propulsion motor, and instruct the motor actuator to rotate the at least one selectively movable electric propulsion motor from a first position to a second position based on the vehicle aerodynamic information.

13. The powertrain of claim 12, wherein the vehicle aerodynamic information includes at least one of: a speed of the vehicle, an acceleration position of the vehicle, a state of charge of the vehicle, a current position of the at least one selectively movable electric propulsion motor, ground clearance of the vehicle, a driving mode of the vehicle, a suspension position of the vehicle.

14. The powertrain of claim 1, further comprising:
a torque ripple motor for reducing vibration;
the at least one selectively movable electric propulsion motor includes a right selectively movable electric propulsion motor and a left selectively movable electric propulsion motor, the torque ripple motor located between the right selectively movable electric propulsion motor and the left selectively movable electric propulsion motor; and
the control module further comprises instructions that when executed by the control system causes the control system to:
determine a torque ripple level from torque ripple information from the at least one sensor to determine if the torque ripple level is above a target level, and
instruct the motor actuator to rotate the at least one of the torque ripple motor, the right selectively movable electric propulsion motor and the left selectively movable electric propulsion motor from a first position to a second position when the torque ripple level is above the target level.

15. The powertrain of claim 14, wherein the torque ripple information includes at least one of: a speed of the vehicle, an acceleration position of the vehicle, a state of charge of the vehicle, a current position of the right selectively movable electric propulsion motor, a current position of the torque ripple motor, a current position of the left selectively movable electric propulsion motor, a current speed of the right selectively movable electric propulsion motor, a current speed of the torque ripple motor, a current speed of the left selectively movable electric propulsion motor, a current torque of the right selectively movable electric propulsion motor, a current torque of the torque ripple motor, and a current torque of the left selectively movable electric propulsion motor.

16. A method for positioning at least one selectively movable electric propulsion motor operatively coupled to a rotatable vehicle drive axle and rotatable about an axis defined by the rotatable vehicle drive axle, the at least one selectively movable electric propulsion motor and mounted to a vehicle chassis of a vehicle, the method comprising:
receiving at least one input from at least one sensor; and
rotating the at least one selectively movable electric propulsion motor based on the at least one input, wherein the at least one selectively movable electric propulsion motor is configured to be mounted within a chassis of the vehicle.

17. The method of claim 16, wherein the at least one input is at least one of noise, vibration, and harshness information, a current ground clearance of the vehicle, driving dynamic information, and aerodynamic information.

18. The method of claim 17, further comprising the steps of:
determining based on the vehicle driving dynamic information when the vehicle is at least one of turning left and turning right;
when the vehicle is turning right, rotating a left selectively movable electric propulsion motor rearward of the rotatable vehicle drive axle and rotating a right selectively movable electric propulsion motor forward of the rotatable vehicle drive axle; and
when the vehicle is turning left, rotating the right selectively movable electric propulsion motor rearward of the rotatable vehicle drive axle and rotating the left selectively movable electric propulsion motor forward of the rotatable vehicle drive axle.

19. The method of claim 16, further comprising the steps of:
determining a torque ripple level from torque ripple information from the at least one sensor to determine if the torque ripple level is above a target level, and
rotating the at least one of a torque ripple motor, a right selectively movable electric propulsion motor and a left selectively movable electric propulsion motor from a first position to a second position when the torque ripple level is above the target level.

\* \* \* \* \*